United States Patent [19]

Niwa et al.

[11] 4,357,085
[45] Nov. 2, 1982

[54] FOCUS DETECTION DEVICE

[75] Inventors: Yukichi Niwa; Mitsutoshi Owada, both of Yokohama; Noriyuki Asano, Kawasaki, all of Japan

[73] Assignee: Canon Kabushiki Kaisha, Tokyo, Japan

[21] Appl. No.: 43,250

[22] Filed: May 29, 1979

[30] Foreign Application Priority Data

May 30, 1978 [JP] Japan .................................. 53-64747

[51] Int. Cl.³ .......................... G03B 3/00; G02B 15/18
[52] U.S. Cl. ...................... 354/25; 354/152; 250/201; 350/423
[58] Field of Search .................. 354/22, 23 R, 25, 126, 354/31, 60 R, 152, 165, 195, 32; 250/201; 356/1, 4, 5; 358/227; 355/56; 352/139, 140, 25 A, 25 N, 25 P; 350/184, 186, 46, 247, 255, 423, 425, 427, 429, 430

[56] References Cited

U.S. PATENT DOCUMENTS

| 3,836,919 | 9/1974 | Matsumoto et al. | 354/25 |
| 4,025,949 | 5/1977 | Whitman | 250/201 X |
| 4,161,756 | 7/1979 | Thomas | 354/140 X |

*Primary Examiner*—L. T. Hix
*Assistant Examiner*—William B. Perkey
*Attorney, Agent, or Firm*—Fitzpatrick, Cella, Harper & Scinto

[57] ABSTRACT

A so-called active-type focus detection device applicable to optical instruments such as camera is provided with light emitting means and photoelectric detector means disposed at two positions conjugate with the pre-arranged focal plane of an image-forming optical system whose focus adjusted condition is to be detected or two positions optically equivalent to the two conjugate positions, and the light emitted from the light emitting means is projected toward an object to which the camera is to be focused, through the image-forming optical system. The light then reflected by the object is received by the photoelectric detector means through the image-forming optical system and the focused condition of the image-forming optical system with respect to the object is detected in accordance with the electrical output of the photoelectric detector means.

According to a preferred embodiment of the present invention, the light emitted from the light-emitting means is projected upon the object by utilization of the maximum half area of the effective aperture of the image-forming optical system while, of the light that is reflected into the image-forming optical system by the object, the light passing through the maximum other half area of the effective aperture of the image-forming optical system is directed to the photoelectric detector means, whereby the position of incidence of the light flux on the light-receiving surface of the photoelectric detector means is varied correspondingly to the focus adjusted condition of the image-forming optical system with respect to the object and the variation in position of incidence of the light flux on the light-receiving surface of the photoelectric detector means is detected in accordance with the electrical output of the photoelectric detector means, thereby detecting the focus adjusted condition of the image-forming optical system with respect to the object.

52 Claims, 27 Drawing Figures

FIG. 5
(a) PULSE OUT CCT. 17 OUTPUT 
(b) PRE-AMPLIFIER 19 OUTPUT 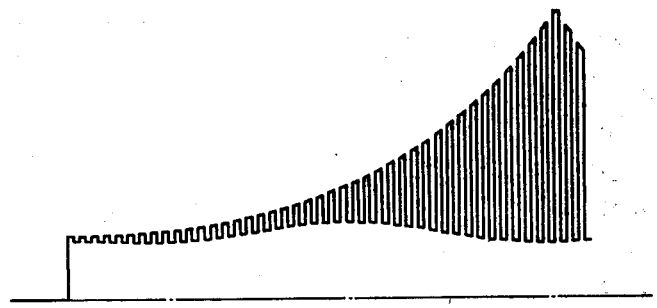
(c) SAMPLE & HOLD CCT. 20 OUTPUT 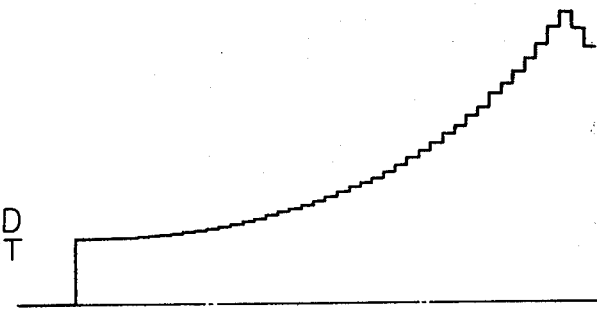
(d) SAMPLE & HOLD CCT. 21 OUTPUT 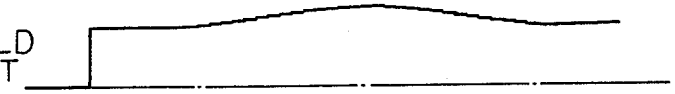

FIG. 5
(e) DIFFERENTIAL AMPLIFIER 23 OUTPUT
(f) PEAK HOLD CCT. 24 OUTPUT
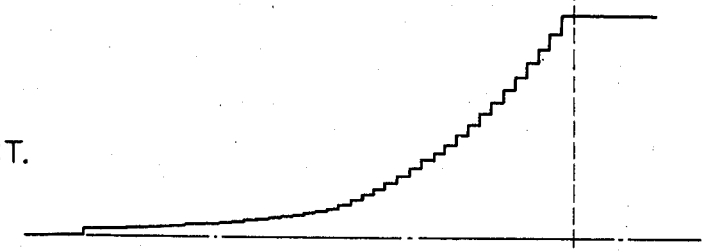
(g) COMPARATOR 25 OUTPUT
FIG. 6
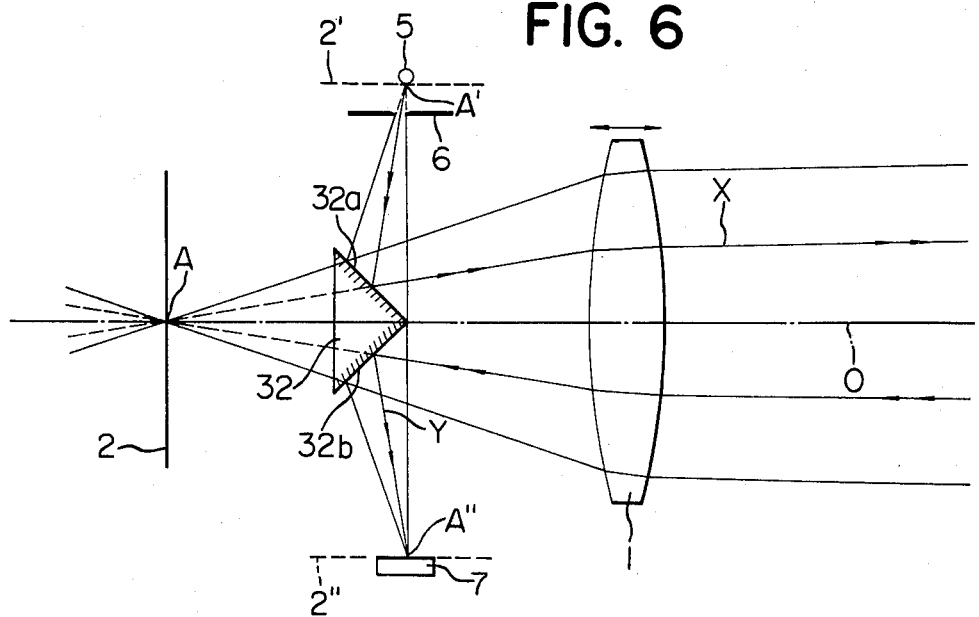

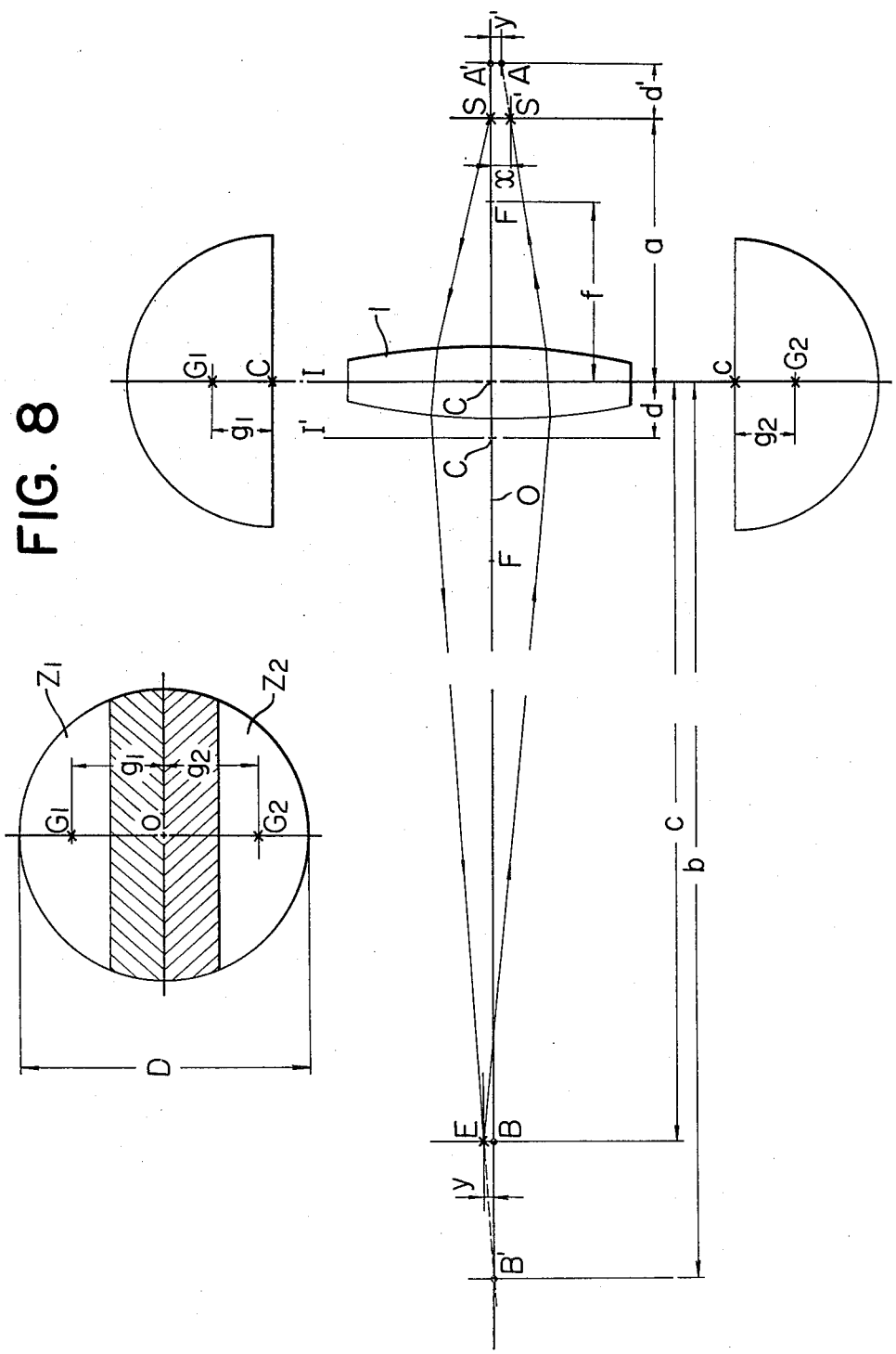

FOCUS DETECTION DEVICE

BACKGROUND OF THE INVENTION

1. Field of the Invention

This invention relates to a focus detection device used in an optical instrument such as camera or the like, and more particularly to a so-called active-type focus detection device in which light is projected from the device side to an object and the light then reflected by the object is photoelectrically detected to thereby detect the focus adjusted condition of an image-forming optical system with respect to the object.

2. Description of the Prior Art

As the system for photoelectrically detecting the focused position of an image-forming optical system with respect to an object, there has long been known the system whereby the non-linear response characteristic of photoelectric substance is utilized to detect the contrast of the image formed by the optical system or the system whereby a lenticular screen or the like is disposed in the prearranged focal plane of the optical system and a photoelectric cell is disposed behind the lenticular screen or the like, so that the focus or the non-focus of the optical system is detected by detecting whether the output from the photoelectric cell becomes a direct current or a pulsating wave during rotation or vibration of the lenticular screen (this is proposed, for example, by U.S. Pat. No. 3,450,018). Both of these systems utilize the light signal produced from the object itself and are called the passive-type focus detection system. The greatest disadvantage of such type of system is that the detection performance thereof is greatly affected by the light signal from the object so that the focus detection is very difficult, for example, for objects of low contrast or of low brightness.

In contrast, there is also known the so-called active-type focus detection system whereby light is projected upon an object and the reflected light therefrom is photoelectrically detected to thereby determine the focused position of the optical system. According to this system, which utilizes an artificial light signal emitted toward the object, the above-described disadvantages peculiar to the passive-type detection system can all be overcome.

However, the following disadvantages exist in the heretofore proposed device adopting the active-type detection system.

As an example of the device of this type, U.S. Pat. No. 3,435,744 or U.S. Pat. No. 3,442,193 proposes a base line range finder type active focus detection device for camera which utilizes the principle of the base line range finder and in which a projected and a photoelectric light receptor are disposed at a predetermined base line interval and at least one of the projector and the photoelectric light receptor is movable and disposed in interlocking relationship with a picture-taking lens or a movable mirror is disposed in the light-receiving path of the photoelectric light receptor in interlocking relationship with the picture-taking lens, and the picture-taking lens is suitably adjusted when the light projected from the projector and reflected by an object is detected by the photoelectric light receptor so that the picture-taking lens is properly focused with respect to the object when the photoelectric light receptor comes to properly receive the reflected light from the object. In the device of this type, however, some interlocking mechanism between the picture-taking lens and the focus detection system, namely, the mechanism for varying the condition of incidence of the reflected light upon the photoelectric light receptor in accordance with the adjusted position of the picture-taking lens, is indispensable and this makes complicated the mechanical construction of the small compact instrument such as camera or the like into which the mechanism is to be incorporated, and in fact, the incorporation thereof into the camera or the like involves much difficulty. Also, in this case, if a mechanical error is created in this interlocking mechanism, such error will greatly affect the detection accuracy to deteriorate the detection accuracy remarkably. Particularly, in the device of this type which utilizes the principle of the base line range finder, a predetermined length of base line must be set between the projector and the light receptor and the greater the length of base line, the easier the focus detection and the higher the accuracy, but a greater length of the base line results in larger size of the entire device and particularly in a small instrument such as camera or the like, the settable length of the base line is limited and accordingly, the improvement of the performance is limited.

SUMMARY OF THE INVENTION

The present invention has been made in view of the above-noted situations and a primary object thereof is to provide a novel focus detection device which, as an active-type focus detection device used in an optical instrument such as camera or the like, eliminates any interlocking mechanism between the image-forming optical system whose focus is to be adjusted and the focus detection system which is found in the heretofore proposed device, thereby further enhancing the detection accuracy, and which may readily be incorporated as a TTL-type focus detection system into a small instrument such as camera or the like.

To achieve such an object, the focus detection device of the present invention is featured in that it is provided with radiation generating means and radiation sensing means disposed substantially in coincidence with two positions conjugate with the prearranged focal plane of the image forming optical system whose focus adjusted condition is to be detected or two positions optically equivalent to the two conjugate positions, and the radiation emitted from the radiation generating means is projected toward an object to which the focus is to be adjusted, through the image-forming optical system while, at the same time, the radiation then reflected by the object is received by the radiation sensing means through the image-forming optical system, whereby the focus adjusted condition of the image-forming optical system with respect to the object is determined on the basis of the electrical output of the radiation sensing means.

Incidentally, according to a preferred embodiment of the present invention, as a specific construction of the device provided with such features, there is proposed a construction in which the substantial center of the radiation generating means and the substantial center of the radiation receiving surface of the radiation sensing means are disposed substantially in coincidence with points conjugate with the point of intersection between the prearranged focal plane of the image-forming optical system and the optic axis thereof or points optically equivalent to said conjugate points, and in which the radiation sensing means is adapted to have its electrical output varied in accordance with the converged condition of the incident radiation on the radiation-receiving surface thereof. In such construction of the device, in the focus adjusted condition of the image-forming optical system with respect to the object, the incident radiation may be best converged on the radiation-receiving surface of the radiation sensing means, whereby at this point of time the electrical output of the radiation sensing means reaches its extremum value and accordingly, in this case, the focused position of the image-forming optical system with respect to the object may be known by detecting the point whereat the electrical output of the radiation sensing means reaches its extreme value.

In this case, the radiation generating means may be one whose radiation has directivity characteristic (Gauss characteristic) or one having no such directivity characteristic but emitting a uniform radiation, but the former can be expected to further enhance the detection efficiency. Where the radiation generating means having the directivity characteristic is employed, it is advisable in preventing deterioration of the detection accuracy to arrange the radiation generating means such that the radiation therefrom is projected through the image-forming optical system while the major axis of the directivity characteristic thereof, namely, the locus of the point whereat the intensity thereof is highest over the distribution of the radiation, is substantially coincident with the optic axis of the image-forming optical system.

Another object of the present invention, in addition to the above-described primary object, is to cause the position of incidence of the radiation flux on the radiation-receiving surface of the radiation sensing means to be varied in accordance with the focus adjusted condition of the image-forming optical system with respect to the object by a very simple, particularly, optical contrivance, and detect the position of incidence of the radiation flux on the radiation-receiving surface of the radiation sensing means, instead of detecting the converged condition of the radiation flux on the radiation-receiving surface of the radiation sensing means as in the above-described embodiment, thereby enabling the focus adjusted condition of the image-forming optical system with respect to the object to be detected with higher accuracy.

As a more advantageous construction of the device which achieves such an object, according to another preferred embodiment of the present invention, there is proposed a construction in which, of the radiation projected toward the object through the image-forming optical system and reflected by the object to the image-forming optical system, the radiation passed through the maximum half area of the effective aperture of the image-forming optical system is directed to the radiation sensing means to thereby vary the position of incidence of the radiation flux on the radiation-receiving surface of the radiation sensing means in accordance with the focus adjusted condition of the image-forming optical system with respect to the object and detect the position of incidence of the radiation flux on the radiation-receiving surface of the radiation sensing means on the basis of the electrical output of the radiation sensing means, thereby detecting the focus adjusted condition of the image-forming optical system with respect to the object.

Incidentally, in this embodiment, as regards the radiation to be projected through the image-forming optical system toward the object, the radiation emitted from the radiation generating means is projected by utilization of the maximum other half area of the effective aperture of the image-forming optical system, and this is more advantageous in that the variation in the position of incidence of the radiation flux on the radiation-receiving surface of the radiation sensing means corresponding to the variation in the focus adjusted condition of the image-forming optical system with respect to the object may be further increased and, accordingly, the accuracy of the focus detection may be further enhanced.

In such a construction of the device, the area of the effective radiation-receiving surface of the radiation sensing means is limited so as to substantially correspond to the size of the one-to-one magnification image of the radiation generating portion of the radiation generating means and the so constructed radiation sensing means is disposed in such a manner that the center of the effective radiation-receiving surface thereof is substantially in a conjugate relationship with the substantial center of the radiation generating portion of the radiation generating means. That is, in such an arrangement and construction, the radiation flux properly impinges on the center of the effective radiation-receiving surface of the radiation sensing means in the focus adjusted condition of the image-forming optical system with respect to the object, whereby at this point of time the electrical output of the radiation sensing means reaches its extreme value while, on the other hand, the position of incidence of the radiation flux becomes deviated from the center of the effective radiation-receiving surface of the radiation sensing means along the receiving surface as the image-forming optical system becomes out of focus, whereby the electrical output of the radiation sensing means becomes gradually deviated from said extremum value and after all, the focused position of the image-forming optical system with respect to the object can be detected by detecting the point whereat the electrical output of the radiation sensing means reaches the extremum value.

A greater advantage obtained by the construction of the device proposed according to this embodiment is that since it is directed to the detection of the variation in the position of incidence of the radiation flux on the radiation-receiving surface of the radiation sensing means, not only the focus and the non-focus of the image-forming optical system with respect to the object but also the directivity of the out-of-focus during the non-focus, namely, the distination between the so-called front focus and rear focus, can be discriminated very accurately and easily. In view of such an advantage, according to a preferred embodiment of the present invention, there is proposed a construction of the device in which radiation sensing means comprising two independent radiation sensing cells is utilized as the radiation sensing means and this is disposed such that the separating line (boundary line) of the effective radiation-receiving surface of each sensing cell is in a conjugate positional relationship with the substantial center of the radiation generating means and the distination between the focus, the front focus and the rear focus may be detected by comparing the outputs of the two sensing cells (for example, by detecting the difference therebetween). According to another embodiment, there is proposed a device in which a self-scanning type image sensor known as a CCD photosensor, BBD photosensor or MOS photodiode array is employed as the radiation sensing means so that the position of incidence of the radiation flux on the radiation-receiving surface of the image sensor is detected on the basis of the time series scanning output of the image sensor. In this case, the image sensor is disposed in such a manner that the center of the radiation-receiving surface thereof is in a conjugate relationship with the substantial center of the radiation generating means, and whether the position of incidence of the radiation flux on the radiation-receiving surface of the image sensor is coincident with the center thereof or whether such position of incidence is deviated leftwardly or rightwardly (or forwardly or backwardly) is detected on the basis of the time series scanning output of the image sensor. As a concrete method in this case, a particular sensor element in the array of a plurality of sensor elements of the image sensor which is located near the center thereof is placed in a conjugate relationship with the substantial center of the radiation generating means and the address of the particular sensor from the predetermined position thereof in the array is memorized in that case, and during the focus detection, the address of the sensor element from said predetermined position in the array which corresponds to the position of incidence of the radiation flux in the array is detected on the basis of the time series scanning output of the image sensor and this is compared with the aforementioned memorized address, whereby the distination between the focus and the front focus and the rear focus is discriminated on the basis of the result of the comparison. As a further method, an up-down or reversible counter is utilized to detect whether the position of incidence of the radiation flux on the radiation-receiving surface of the image sensor is coincident with the center thereof or deviated leftwardly or rightwardly (or forwardly or backwardly).

Again in the device of such construction, the radiation generating means may be one having directivity characteristic or one having no such directivity characteristic, but where the radiation generating means having directivity characteristic is employed, it is advisable in enhancing the detection accuracy to see to it that the major axis of the directivity characteristic passes through the marginal area of the image-forming optical system remote from the center thereof.

Still another object of the present invention is to provide a more advantageous form of the zoom lens assembly which incorporates therein the focus detection device as described above.

For such an object, according to a preferred embodiment of the present invention, there is proposed an advantageous form of automatic focus detection zoom lens assembly having at least a movable front focusing lens group and a movable zooming lens group and in which radiaton generating means and radiation sensing means are directly incorporated in the lens barrel thereof and a reflecting optical system is disposed between the focusing lens group and the zooming lens group so that the radiation emitted from the radiation generating means is projected toward an object through the focusing lens group and the radiation then reflected by the object is received by the radiation sensing means through the focusing lens group. In this case, the radiation generating means and the radiation sensing means are disposed at two positions conjugate with the position of the prearranged focal plane of the focusing lens group, namely, in this case the focal plane of the focusing lens group in a condition wherein it is focused with respect to an object at infinity, or two positions optically equivalent to said two conjugate positions. In that case, it is proposed to adopt, as the reflecting optical system, a compact construction of the so-called folded optical system which comprises a total reflection mirror and a half mirror and which does not occupy a large space between the focusing lens group and the zooming lens group. Also, in the construction of such zoom lens assembly, not only the radiation generating means and the radiation sensing means but also the detection circuit for receiving the electrical output of the sensing means may be as an integrated circuit which can be compactly incorporated and it is further possible to provide electrical drive means for automatically adjusting the focusing lens group in a responsive relationship with the output of the detection circuit.

In the device described above, the radiation generating means may specifically be a light-emitting device such as light-emitting diode or laser diode and particularly, in the case of a motion picture camera or a TV camera in which continuous focus control is required with respect to moving objects, it is advisable to adopt radiation generating means which emits non-visible light.

Other objects and features of the present invention will become apparent from the following detailed description taken in conjunction with the accompanying drawings.

BRIEF DESCRIPTION OF THE DRAWINGS

Some embodiments of the present invention will hereinafter be described with reference to the accompanying drawings, in which:

FIGS. 5(a)–5(g) are output waveform plots showing the outputs in the circuit blocks of essential portions in the circuit system of FIG. 4;

FIG. 6 is a schematic view of an optical arrangement and construction for illustrating a second system of focus detection adopted in the device of the present invention;

FIG. 8 is a schematic view useful in understanding the principle in the second system;

DESCRIPTION OF THE PREFERRRED EMBODIMENTS

Figure 1:
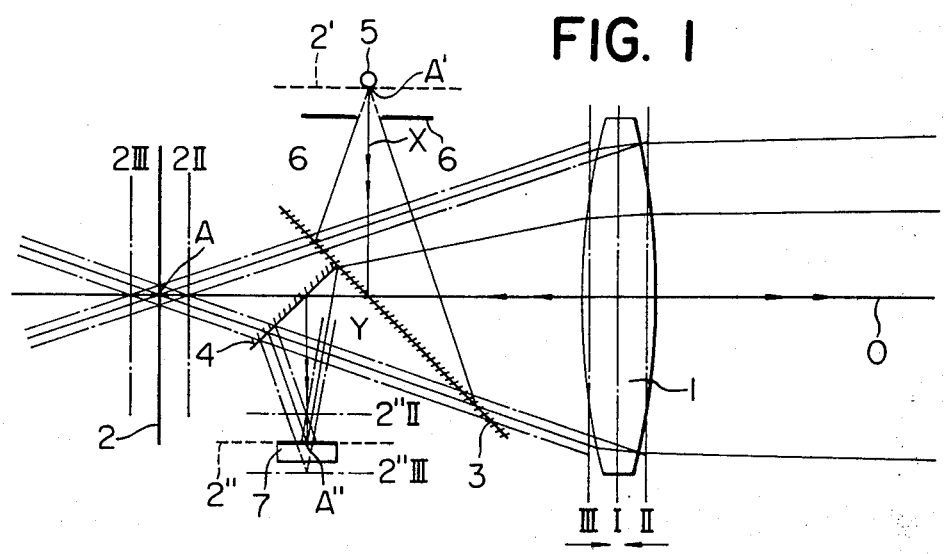
FIG. 1 is a schematic view of an optical arrangement and construction for illustrating a first system of focus detection adopted in the device of the present invention.
Figure 2:
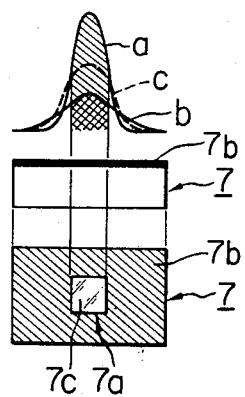
FIG. 2 is a schematic view showing the details of a photoelectric light receptor in the arrangement and construction of FIG. 1 and the state of variation in quantity of light received by the light-receiving portion thereof during the focus detection.
Figure 3:
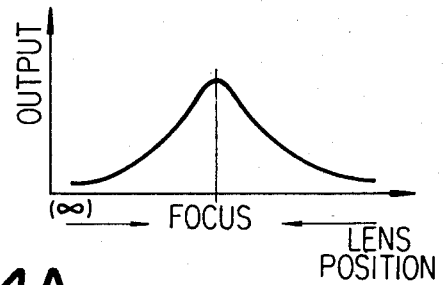
FIG. 3 is an output waveform plot showing the state of variation in output of the photoelectric light receptor during the focus detection.

Reference is first had to FIGS. 1 to 3 to describe a first focus detection system adopted in the device of the present invention. In the arrangement shown in FIG. 1, reference numeral 1 designates an image forming lens adjustable along the optic axis thereof, and reference numeral 2 denotes the prearranged focal plane thereof (in the case of a camera, the film surface). Designated by 3 is a half-mirror obliquely disposed between the lens 1 and the prearranged focal plane 2 at a predetermined angle (e.g. 45°) with respect to the optic axis 0. Designated by 4 is a total reflection mirror obliquely disposed behind the half-mirror 3 also at a predetermined angle (e.g. 45°) with respect to the optic axis 0. Denoted by 5 is a light-emitting device such as light-emitting diode or semiconductor laser disposed in a plane 2' conjugate with the prearranged focal plane 2 set by the half-mirror 3 in such a manner that the substantial center of the light emitting portion thereof is coincident with a particular point on the prearranged focal plane 2, for example, a point A' conjugate with the point of intersection A with the optic axis 0. Denoted by 6 is a knife edge for limiting the light emitted from the light-emitting device 5, as shown. Designated by 7 is a photoelectric light receptor such as silicon photodiode or the like disposed in a plane 2" conjugate with the prearranged focal plane 2 set by the total reflection mirror 4 in such a manner that the substantial center of the light receiving portion thereof is coincident with a point A" conjugate with the point A.

The light-emitting device 5 is one which emits infrared or near-infrared light. The light receptor 7, as shown, for example, in FIG. 2, has its light receiving portion 7a limited by a light-intercepting portion 7b so that the light receiving portion is smaller than the one-to-one magnification image of the light-emitting portion of the light-emitting device, and a wavelength selecting filter 7c which may cut the visible range light and may pass only infrared or near-infrared light is provided correspondingly to the light-receiving portion 7a so that the light receptor is responsive only to the emitted light from the light-emitting device 5. The light-emitting device 5 is regulated so that the locus X of the center of gravity of the light flux emitted therefrom and projected on an unshown object via the knife edge 6, the half-mirror 3 and the lens 1 is coincident with the optic axis 0 of the lens 1, and accordingly, the locus Y of the center of gravity of the light flux reflected by the object and directed to the light receptor 7 via the lens 1, the half-mirror 3 and the total reflection mirror 4 becomes coincident with the substantial center axis of the light receiving portion 7a of the light receptor 7.

Now, in such a construction, the light flux emitted from the light-emitting device 5 and limited by the knife edge 6 is reflected by the half-mirror 3, whereafter it is projected on an unshown object through the lens 1 along the optic axis 0, and the reflected light from the object returns to the lens 1 along the optic axis 0 and passes through the half-mirror 3, whereafter the light is reflected by the total reflection mirror 4 and enters the light receptor 7. Here, assuming that the image plane of the image of the object formed by the lens 1 is exactly coincident with the prearranged focal plane 2 (in this state, the lens 1 is in focused position with respect to the object and the then position of the lens is defined as I), the light-emitting device 5 and the light receptor 7 is in a conjugate relationship with the prearranged focal plane 2 and moreover, the substantial centers of the light-emitting portion and the light receiving portion 7a are coincident with the conjugate points A' and A", so that in this state the reflected light from the object is converged at the center (i.e. point A") of the light receiving portion 7a of the light receptor 7 and the image of the light-emitting portion of the light-emitting device 5 is formed at one-to-one magnification on the light receptor 7 and accordingly, the then pattern of distribution of quantity of light on the light receptor 7 becomes such as shown by a in FIG. 2 and therefore, the quantity of light received by the light-receiving portion 7a becomes maximum as indicated by the shaded portion in this pattern a and after all, at this time, the output of the light-receptor 7 reaches its peak.

In contrast, where the lens 1 lies at a position II or III in FIG. 1 with respect to the same object (these positions are axially symmetrical with respect to the position I) or where the object becomes far off or approaches the lens 1 when the lens 1 lies at the position I, the image plane of the image of the object formed by the lens 1 assumes a position indicated by 2II (front focus condition) or a position indicated by 2III (rear focus condition) in FIG. 1 and in this state, the reflected light from the object is converged on a plane indicated by 2"II or 2"III in FIG. 1 and therefore, the then pattern of distribution of quantity of light on the light receptor 7 becomes such as, for example, shown by b in FIG. 2, so that the quantity of light received by the light-receiving portion 7a becomes smaller than in the aforementioned case, as shown by the shaded portion in the pattern b and after all, the output of the light receptor 7 also becomes lower than in the aforementioned case. The pattern c in FIG. 2 shows the pattern of distribution of quantity of light of the reflected light from the object on the light receptor 7 when the lens 1 lies at a position intermediate of the positions I and II or I and III with respect to the object.

Accordingly, assuming that the lens 1 is gradually moved forwardly from its most backward position (for example, a position which is focused with respect to an object at infinity) with respect to an object at a finite distance, the then output of the light receptor 7 is varied as shown in FIG. 3 and reaches its peak when the lens 1 has reached its focused position with respect to that object and therefore, after all, the focused position of the lens 1 with respect to the object can be detected by detecting the point whereat the output of the light receptor reaches its peak.

Figure 4A:
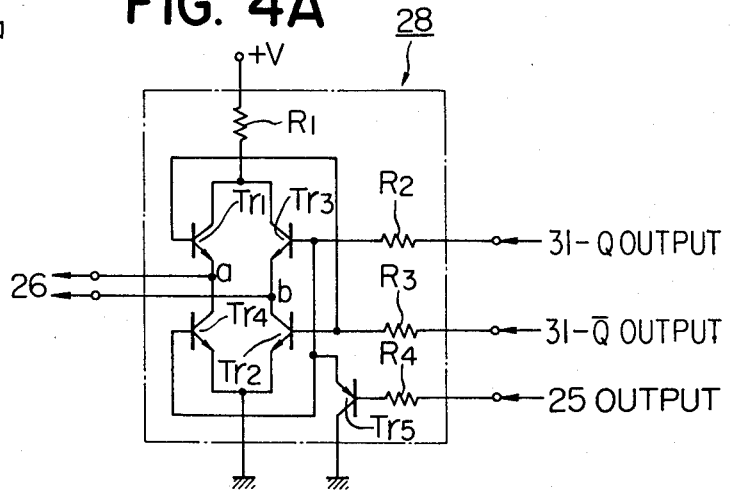
FIG. 4A is a partial circuit diagram showing a specific example of the motor control circuit in the circuit system of FIG. 4.
Figure 4:
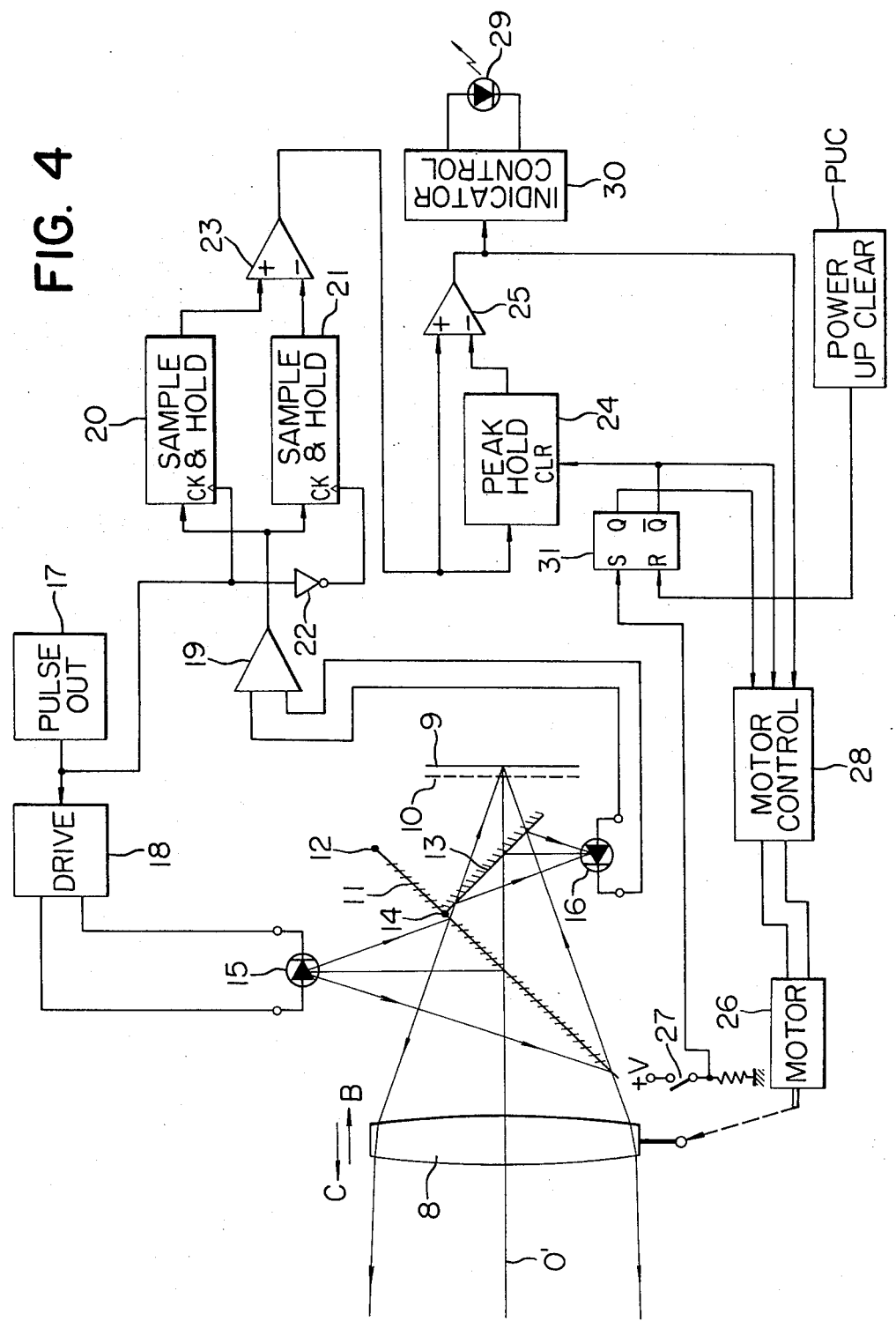
FIG. 4 shows chiefly the construction of the circuit system of an embodiment of the device adopting the first system illustrated in FIGS. 1 to 3.

Reference is now had to FIGS. 4 and 5 to describe an embodiment which adopts the above-described first system to form a TTL focus detection system used, for example, for a single lens reflex camera.

Reference is first made to FIG. 4 to describe the construction thereof. Designated by 8 is a picture-taking lens adjustable along the optic axis 0' thereof, 9 a film surface, 10 a shutter curtain, and 11 a finder reflex mirror pivotably hinged by means of a shaft 12. In the present embodiment, the finder reflex mirror 11 is a half-mirror. Designated by 13 is a total reflection mirror rotatably hinged to the reflex mirror 11 by means of a shaft 14. Denoted by 15 is a light-emitting device such as light-emitting diode which emits infrared or near-infrared light. Designated by 16 is a light-receiving device such as photodiode. These are arranged in the relationship described with respect to FIG. 1. In this case, however, a focusing glass is disposed at the position of the light-emitting device 15 in the usual single lens reflex camera and therefore, it would actually be preferable to set a plane conjugate with the film surface 9 at another position by an additional optical element and dispose the light-emitting device 15 there.

The reflex mirror 11 and the total reflection mirror 13 most be folded during camera release and as the mechanism therefor, the construction as disclosed in FIG. 3 of German Patent Offen Legungsscrift 2710695 issued to the assignee of this application (laid-open on Sept. 15, 1977 and entitled "Single Lens Reflex Camera") may be adopted intactly. Where a silicon photodiode is employed as the light-receiving device, it is possible to make it responsive only to infrared or near-infrared light by deepening the PN junction layer thereof and accordingly, it is possible to eliminate the filter 7c in FIG. 2. Of course, in this case, the light-receiving portion of the light-receiving device 16 is limited as described with respect to FIG. 2.

Designated by 17 is a pulse output circuit for putting out a pulse of a predetermined frequency as shown, for example, in FIG. 5A. Denoted by 18 is a light emission drive circuit for controlling the light emission of the light-emitting device 15 in accordance with the pulse from the pulse output circuit 17. The light emission drive 18 is designed as a switching circuit for turning on the light-emitting device when the pulse is at high level and for turning off the light-emitting device when the pulse is at low level. Designated by 19 is a preamplifier for amplifying the output of the light-receiving device. Denoted by 20 and 21 are sample and hold circuits for sampling and holding the output from the preamplifier 19. The output pulse from the pulse output circuit 17 is imparted as the sampling pulse to the sample and hold circuit 20, and the inverted pulse of the output pulse inverted by an inverter 22 is imparted as the sampling pulse to the sample and hold circuit 21. Thus, the output of the sample and hold circuit 20 is the output of the preamplifier 19 when the light-emitting device 15 is emitting light which has been sampled and held, while the output of the sample and hold circuit 21 is the output of the preamplifier 19 when the light-emitting device 15 is not emitting light (this is an output corresponding to the infrared or near-infrared light component in the outdoor light and represents a noise component) which has been sampled and held. Denoted by 23 is a differential amplifier for obtaining the difference between the outputs of the sample and hold circuits 20 and 21. The differential amplifier 23 is designed to receive the output of the sample and hold circuit 20 at its non-inverting input and to receive the output of the sample and hold circuit 21 at its inverting input and accordingly, from the differential amplifier 23, there is obtained a detection signal purely corresponding only to the emitted light from the light-emitting device 15 from which the noise component due to the outdoor light has been eliminated. Denoted by 24 is a peak hold circuit for holding the peak of the output of the differential amplifier 23, and designated by 25 is a comparator for comparing the magnitude of the output of the peak hold circuit with the magnitude of the output of the differential amplifier 23. The comparator 25 is designed to receive the output of the differential amplifier 23 at its non-inverting input and to receive the output of the peak hold circuit 24 at its inverting input, and puts out a high-level signal when the output of the differential amplifier 23 is equal to or larger than the output of the peak hold circuit 24 and puts out a low-level signal when the output of the differential amplifier 23 is smaller than the output of the peak hold circuit 24. Denoted by 26 is a drive motor for driving the picture-taking lens 8. Designated by 27 is a normally-open set switch disposed so as to be closed by the picture-taking lens 8 when the lens 8 is at a position most moved in the direction of arrow B, for example, a position slightly past the infinity focus position. Denoted by 31 is an RS flip-flop designed so as to be reset by a power-up clear signal from a power-up clear circuit PUC during the closing of a main switch, not shown and to be set by a set signal (high pulse) obtained during the closing of the set switch 27. Designated by 28 is a motor control for controlling the motor 26. The motor control 28 is so arranged to rotate the motor 26 in a predetermined direction to move the lens 8 in the direction of arrow B in response to the high of the Q output of the flip-flop 31, and then to reverse the direction of rotation of the motor 26 to move the lens in the direction of arrow C in response to the high of the Q output of the flip-flop 31, and to stop the motor 26 at a point of time whereat the output of the comparator 25 is inverted from the high to the low in the course of movement of the lens 8 in the direction of arrow C. In this case, the motor control 28 has a construction as shown in FIG. 4A, for example. In FIG. 4A, $Tr_1$–$Tr_4$ are complementarily connected npn switching transistors, and the transistors $Tr_1$ and $Tr_2$ are designed to receive the Q output of the flip-flop 31 at their bases and the transistors $Tr_3$ and $Tr_4$ are designed to receive the Q output of the flip-flop 31 at their bases, and the motor 26 is inserted and connected between the complementary connection lines a-b of the transistor circuit. $Tr_5$ is a pnp switching transistor designed to receive the output of the comparator 25 at its base, and the bases of the transistors $Tr_3$ and $Tr_4$ are further connected to the emitter side of the transistor $Tr_5$. $R_1$–$R_4$ are protective resistors. In the circuit of such construction, when the flip-flop 31 is reset and the Q output thereof becomes high, the transistors $Tr_1$ and $Tr_2$ are thereby turned on, so that the motor 26 is rotated in a predetermined direction to drive the lens 8 in the direction of arrow B, and when the flip-flop 31 is set and the Q output thereof becomes high, the transistors $Tr_3$ and $Tr_4$ are now turned on under the condition that the transistor $Tr_5$ is turned off by the high of the output of the comparator 25, whereby the rotation of the motor 26 is reversed to drive the lens 8 in the direction of arrow C, and when the output of the comparator 25 changes from high to low in the course of drive of the lens 8 in the direction of arrow C, the transistor Tr₅ is thereby turned on to turn off the transistors Tr₃ and Tr₄, thus stopping the motor 26.

Designated by 29 is an indicator device such as light-emitting diode for indicating the focus. This indicator 29 is disposed at such a position that the turned-on state thereof can be visually confirmed within the finder. Denoted by 30 in an indicator control which is designed as a switching circuit for turning on the display element 29 at a point of time whereat the output of the comparator 25 is inverted from high to low.

The aforementioned peak hold circuit 24 is so designed that it is kept in cleared condition by the Q output of the flip-flop 31 being imparted to the clear terminal CLR thereof as long as the Q output is high.

In the above-described construction, if an unshown main switch is closed by depressing the release button of camera to a first stage with the camera aimed at a desired object while the photographer is looking into the finder of the camera, power is supplied to the circuit shown in FIG. 4 and the flip-flop 31 is reset by the power-up clear signal put out from the power-up clear circuit PUC and the Q output thereof becomes high. By this, the peak hold circuit 24 is placed in its cleared state while the motor control 28 starts the motor 26 so as to move the picture-taking lens 8 in the direction of arrow B, as already described. When the lens 8 reaches its end position in the direction of arrow B, the set switch 27 is closed thereby and by the set signal then obtained, the flip-flop 31 is set and the Q output thereof becomes low while the Q output thereof becomes high. By this, the peak hold circuit 24 is released from its cleared state, while the motor control 28 reverses the direction of rotation of the motor 26 as described above and accordingly, the lens 8 is now moved in the direction of arrow C.

On the other hand, when the power supply to the circuit system is started upon closing of the main switch, the pulse as shown in FIG. 5A is put out from the pulse out circuit 17 and accordingly, the light emission drive 18 turns on and off the light-emitting device 15 at a period corresponding to the pulse at this time. The emitted light from the light emitting device at this time, as described with respect to FIG. 1, is projected onto the object via the reflex mirror 11 and the picture-taking lens 8 and the light then reflected from the object returns to the picture-taking lens 8 and passes through the reflex mirror 11, whereafter it is reflected by the total reflection mirror 13 and directed to the light-receiving device 16. Assuming that the object lies at a certain finite distance, the quantity of light received by the light-receiving device 16 is increased with the then movement of the lens 8 in the direction of arrow C, as is apparent from the principle described in connection with FIG. 1, so that the output of the pre-amplifier 19 is varied as shown in FIG. 5B and at this time, the output pulse of the pulse out circuit and the inverted pulse thereof are imparted as the sampling pulse to the sample and hold circuits 20 and 21, respectively, and therefore, the outputs of these sample and hold circuits 20 and 21 are varied as shown in FIGS. 5C and 5D, respectively, and after all, during this time, the output as shown in FIG. 5E is obtained from the differential amplifier 23 and the output as shown in FIG. 5F is obtained from the peak hold circuit 24. The then outputs of the differential amplifier 23 and the peak hold circuit 24 are compared with each other by the comparator 25 and the output of the comparator 25, as shown in FIG. 5G, keeps high level because the outputs of the differential amplifier 23 and the peak hold circuit 24 are the same until the picture-taking lens 8 reaches its focused position with respect to the object, but whenever the picture-taking lens goes past its focused position with respect to the object to any slightest degree, the quantity of light received by the light-receiving device 16 is decreased and the output thereof is reduced and accordingly, the output of the peak hold circuit 24 remains at its maximum while the output of the differential amplifier 23 comes to be somewhat reduced from this maximum value at this point of time, as shown in FIG. 5E, and therefore the output of the comparator 25 is inverted from high to low at this point of time. When the output of the comparator 25 is inverted from high to low, the motor control 28 immediately stops the motor 26 in response thereto as described above, and accordingly, at this time, the picture-taking lens 8 is stopped in properly focused condition with respect to the object. Also, the indicator control 30 turns on the indicator element 29 by the variation in output of the comparator 25 at this time and it is thus displayed in the finder that the picture-taking lens 8 has been properly focused with respect to the object.

If the release button is depressed to a second stage, the reflex mirror 11 and the total reflection mirror 13 are folded and retracted from the picture-taking light path, whereafter the shutter curtain 10 is opened and a clear image of the object is photographed on the film surface 9.

In the camera shown in FIG. 4, the automatic focusing of the picture-taking lens 8 is accomplished in the above-described manner.

In the construction of the device shown in FIGS. 1 and 4, the light-emitting device 6, 15 may be one which has a directivity of its emitted light or one which has no directivity but emits a uniform light, and where a light-emitting device having the directivity is employed, it would be advisable for enhancing the detection accuracy to coincide the major axis of the directivity, namely, the locus axis of the point having the highest intensity of light, with the optic axis O, O' of the lens, 1, 8.

Figure 7:
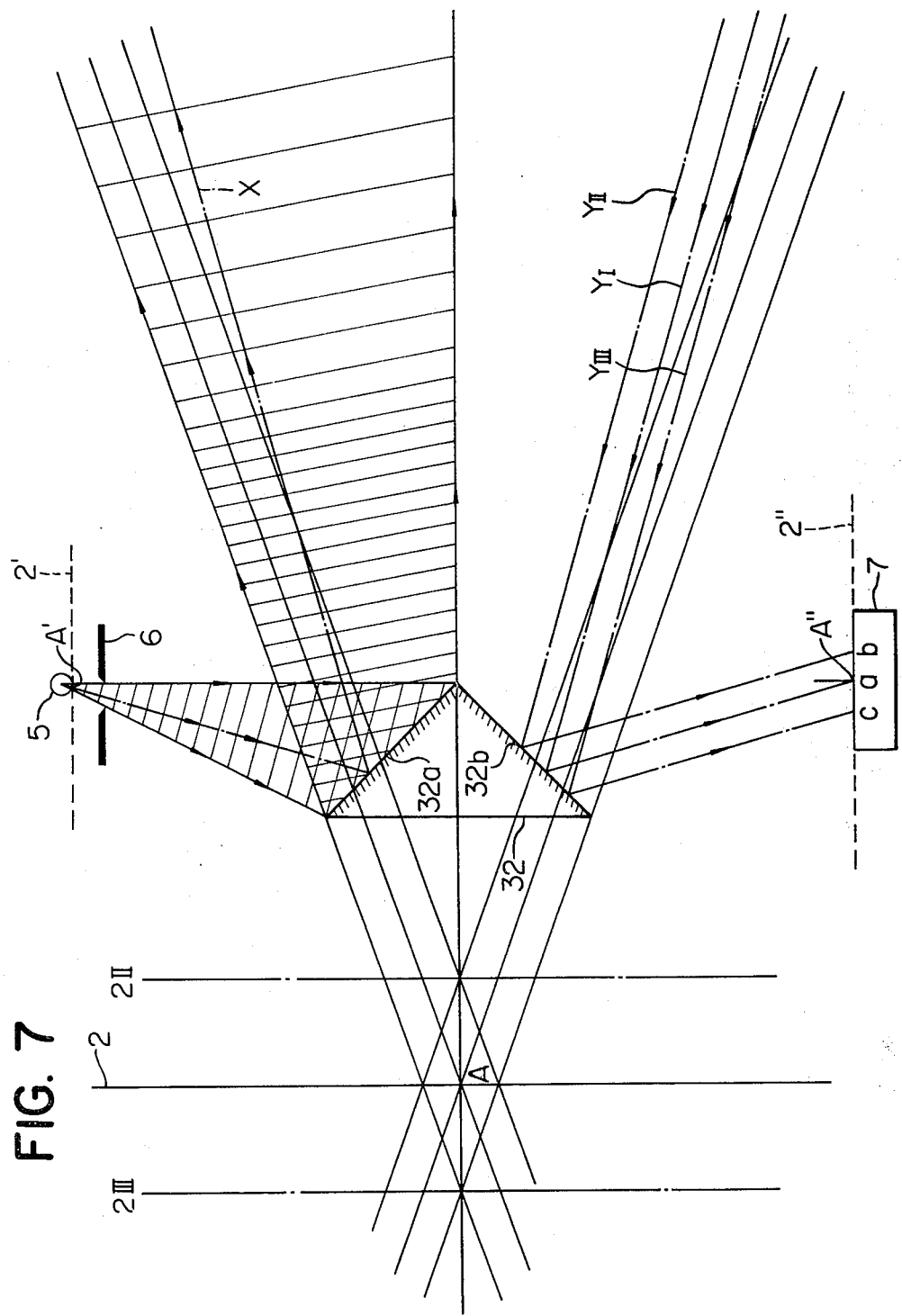
FIG. 7 is an enlarged schematic view of essential portions of the FIG. 6 arrangement and construction and showing the optical relationship thereof.

As the light-receptor 7, 16, use may be made a self-scanning type image sensor known as CCD photosensor, BBD photosensor or MOS photodiode array and when such an image sensor is employed, it is possible to effect focus detection by utilizing the circuit system disclosed in FIG. 7 of U.S. Pat. No. 4,047,187 of the assignee of this application (filed on Mar. 31, 1975 and issued on Sept. 6, 1977 and entitled "System for Exposure Measurement and/or Focus Detection by means of Image Sensor", granted to Mashimo et al.).

Reference is now had to FIGS. 6 to 9 to describe a second system of focus detection adopted in the device of the present invention. This second system is designed to accomplish focus detection by utilizing the fact that the light emitted from the light-emitting device is projected onto an object by utilization of the maximum half of the effective aperture of the image-forming lens while, of the light then reflected by the object and entering the image-forming lens, the light passed through the maximum other half area of the effective aperture of the image-forming lens is made to pass to the photoelectric light-receptor, whereby the position of incidence of the light flux on the light-receiving surface of the photoelectric light-receptor is varied in accordance with the focus adjusted condition of the image-forming lens with respect to the object.

Referring first to FIGS. 6 and 7, the elements given reference characters similar to those in FIG. 1 are similar in construction and optical arrangement to those already described. Designated by 32 is a total reflection prism provided in place of the half-mirror 3 and the total reflection mirror 4 of FIG. 1 and having two total reflection surfaces 32a and 32b. The total reflection prism 32 has, for example, a vertical angle of 90° and is disposed in such a manner that the total reflection surfaces 32a and 32b thereof are symmetrical with respect to the optic axis O of the image-forming lens 1. The light-emitting device 5 and the light receptor 7 are disposed on the conjugate planes 2' and 2'' of the prearranged focal plane 2 set by the total reflection surfaces 32a and 32b in such a manner that the centers of the light-emitting portion and the light-receiving portion 7a are respectively coincident with the conjugate points A' and A'' of the point A. Accordingly, in this case, the light emitted from the light-emitting device 5 is projected by utilization of the maximum upper half of the effective aperture of the image-forming lens due to the action of the total reflection surface 32a of the prism 32, while of the light flux then reflected by the object and entering the image-forming lens 1, only the light flux passed through the maximum lower half of the effective aperture of the image-forming lens 1 is directed to the light receptor 7 due to the action of another total reflection surface 32b of the prism 32.

In the ensuing description, for easier understanding, the light-emitting device 5 is treated as one which has no directionality but emits uniform light. Of course, the light-emitting device 5 may safely be one which has directionality, but this will later be described. In FIGS. 6 and 7, X represents the locus of the center of gravity of the light flux projected by utilization of the upper half area of the effective aperture of the lens 1, and Y represents the locus of the center of gravity of the light flux incident through the lower half area of the effective aperture of the lens 1 which is limited by the total reflection surface 32b of the prism 32.

In such an optical relationship, the locus Y of the center of gravity of the light flux reflected from the object back to the image-forming lens 1 and reflected by the total reflection surface 32b of the prism 32 toward the light receptor 7 becomes shifted in accordance with the adjustment of the image-forming lens 1. Referring now to FIG. 7, the light flux emitted from the light-emitting device 5 and passed through the knife edge 6 and reflected by the total reflection surface 32a of the prism 32 and projected toward the object through the image-forming lens 1 is shown by hatching. On the other hand, the light flux reflected back from the object becomes light fluxes whose locuses of the center of gravity are represented by YI, YII and YIII in accordance with the position of the image-forming lens 1, if the object is stationary, and is reflected by the total reflection surface 32b and reaches the light receptor 7. Where the lens 1 is at a focused position with respect to the object and accordingly, the image plane of the image formed by the lens 1 is coincident with the prearranged focal plane 2, the locus of the center of gravity of the reflected light flux is represented by YI and accordingly, the then position of the center of gravity of the light flux on the light receptor 7 is the position indicated at a (namely, the conjugate point A'' of the point A), whereas if the lens 1 is deviated forwardly or rearwardly from the then focused position (for example, the position indicated at II or III in FIG. 1) or if the object becomes far off or approaches the lens 1, the then image plane is 2II or 2III and the locus of the center of gravity of the reflected light flux therefor becomes as represented by YII or YIII and after all, the position of the center of gravity on the light receptor 7 becomes shifted on the light receptor 7 as shown by b or c, respectively.

Here, reference is had to FIG. 8 to describe the principle on which the locus Y of the center of gravity of the reflected light flux becomes deviated as the image plane of the image of the object formed by the image-forming lens 1 is deviated with respect to the prearranged focal plane 2.

In FIG. 8, a point S on the optic axis O of the image-forming lens 1 is the set position of the prearranged focal plane 2. The center of each of the light-emitting device and the light receptor is in conjugate positional relationship with the point S and accordingly, in the Figure, the centers of the light-emitting device and the light receptor are all represented by the point S. I designates the position of the image-forming lens 1. A point B is the detection point in the object plane. The position whereat the image of the point B is formed most sharply is indicated by a point A, and the point A has a deviation d' in the direction of the optic axis O with respect to the point S. Also, assume that the position of the image-forming lens 1 in which the point B is imaged most sharply at the point S by the image-forming lens 1, namely, the focused position with respect to the point B, is I' and that the position I' is deviated by d from the position I. Let c be the distance between I and B, and a be the distance between I and S. Assume that B' is the point whereat the point S is imaged most sharply when the image-forming lens 1 lies at the position I and that b is the distance between I and B'. The light flux emanating from the point S passes through a predetermined limited aperture area of the image-forming lens 1 (namely, the upper half area of the effective aperture) and is projected on the object surface. The light flux reflected by the object surface again passes through another limited aperture area of the image-forming lens 1 (namely, the lower half area of the effective aperture) to the light receptor. Let $G_1$ be the center of gravity of the projected light flux in the predetermined limited cross-section of the image-forming lens 1 through which the light flux passes, and $g_1$ be the distance thereof from the center C of that lens. Also, let $G_2$ be the center of gravity of the reflected light flux in the predetermined limited cross-section of the image-forming lens 1 through which the light flux passes, and $g_2$ be the distance thereof from the center C of that lens. Let E be the point whereat the light ray emanating from the point S and passing through $G_1$ reaches the object surface, and y be the distance between B and E. Also, let S' be the point whereat the light ray reflected at the point E and passing through $G_2$ reaches the surface of the light receptor, and x be the distance between S and S'. Then, y and x respectively are the deviation of the center of gravity of the projected light flux on the object surface and the deviation of the incident light flux on the light receptor when the image-forming lens 1 is diviated by the distance d from the position I' to the position I. The position of $G_1$ differs depending on the distribution and orientation characteristic of the intensity of light emitted from the light-emitting device, and also differs depending on the method of limiting the view field. Along therewith, the position of $G_2$ is also determined by the factors such as the reflection characteristic of the object surface and the method of limiting the view field. Let f be the focal length of the image-forming lens and L be the distance from the point S to the object. Then, the following is established:

$$L = a + c \tag{1}$$

$$a^2(a-c)d + fL - ac = 0 \tag{2}$$

From equations (1) and (2), a and c may be derived as follows:

$$a = \tfrac{1}{2}\left(L + 2d + \sqrt{L(L-4f)}\right) \tag{3}$$

$$c = \tfrac{1}{2}\left(L - 2d - \sqrt{L(L-4f)}\right) \tag{4}$$

Also, y is expressed as $$y = \frac{g_1(Lf - ac)}{af} \tag{5}$$

and therefore, the distance y' between the point of intersection A' of the extension of the segment passing through $G_2$ and S' in the plane containing the imaged point A of the point B and the point A is expressed as:

$$y' = \frac{f}{c - f} \cdot y \tag{6}$$

Hence, by using y', x is expressed as:

$$x = \frac{g_2(a + d') - a(g_2 - y')}{a + d'} \tag{7}$$

Since $$a + d' = \frac{cf}{c - f}, \tag{8}$$

equation (7) may be rewritten by using equations (6) and (8), as follows:

$$x = \frac{g_2(Lf - ac) - afy}{cf} \tag{9}$$

From equations (3), (4) and (5), y may be obtained by eliminating a and c:

$$y = \frac{2dg_1\left(d + \sqrt{L^2 - 4fL}\right)}{f\left(L + 2d + \sqrt{L^2 - 4fL}\right)} \tag{10}$$

Also, from equations (3), (4), (5) and (9), x may be obtained by eliminating a and c:

$$x = \frac{2d(g_1 + g_2)\left(d + \sqrt{L^2 - 4fL}\right)}{f\left(L - 2d - \sqrt{L^2 - 4fL}\right)} \tag{11}$$

Equation (10) represents the amount by which the center of gravity of the cross-section of the projected light flux on the object surface is displaced from the optic axis O, and equation (11) represents the amount by which the center of gravity of the light flux reflected by the object surface is displaced from the optic axis O when such light flux enters the light receptor again through the image-forming lens 1. As seen from equation (11), d=0, that is, x=0 in focused condition, and accordingly, the detection of the focus of the image-forming lens 1 may be accomplished by determining x=0 from the output of the light receptor. Also, in the range of d conceivable in an optical instrument such as camera or the like, it is seen that x>0 for d>0 and that x<0 for d<0. By utilizing such a relation, it is also possible to detect the direction of deviation of the focus in non-focused condition of the image-forming lens 1. As seen from equation (11), x is proportional to $g_1 + g_2$. Therefore, to further enhance the accuracy of the focus detection, $g_1 + g_2$ may be made greater and for this purpose, as shown in the left upper portion of FIG. 8, the aperture area of the lens 1 to be utilized for the projection of the light flux may be limited to the marginal area $Z_1$ except the central portion of the lens 1 while the light flux to be directed to the light receptor may also be limited to the light flux passing through the marginal area $Z_2$ of the lens 1 except the central portion thereof. Thus, according to this, the center of gravity $G_1$ of the projected light flux and the center of gravity $G_2$ of the light flux to be directed to the light receptor are mutually spaced apart further toward the marginal portion of the lens 1 with respect to the optic axis O, as shown, and accordingly, the spacing of $g_1 + g_2$ can be increased further. D is the effective aperture diameter of the lens 1.

The foregoing description has been made with respect to the case where use is made of a light-emitting device having no directivity, but where a light-emitting device having directivity is used, the center of gravity $G_1$ of the projected light flux may be made to come near the marginal portion of the lens 1 to thereby increase the $g_1$ by so setting that the major axis of the directivity passes through the lens 1 at a position as far as possible from the center thereof.

Figure 9:
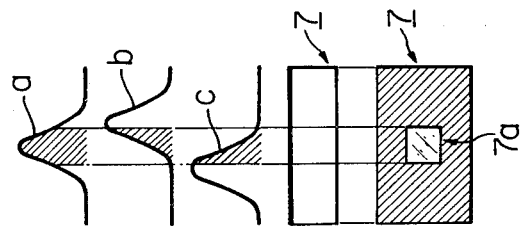
FIG. 9 is a schematic view showing the photoelectric light receptor in the arrangement and construction of FIGS. 6 and 7 and the state of variation in quantity of light received by the light-receiving portion thereof during the focus detection.

As will be appreciated from the foregoing analysis, in the arrangement and construction shown in FIGS. 6 and 7, when the image-forming lens 1 is in focused condition with respect to the object, the position of the center of gravity of the light flux reflected from the object on the conjugate plane 2" is coincident with the conjugate point A" and, the lens 1 becomes deviated from the focused position, the position of this center of gravity is also deviated on the conjugate plane A" and in this case, the distribution pattern of quantity of light of the reflected light on the light receptor 7 is such as indicated by a, b and c in FIG. 9. That is, a is the pattern when the locus of the center of gravity is YI, b is the pattern when the locus of the center of gravity is YII, and c is the pattern when the locus of the center of gravity is YIII. Therefore, if the light-receiving portion 7a of the light receptor 7 is limited as previously described, the quantity of light then received by the light-receiving portion 7a becomes maximum as indicated by the hatching in the patterns a, b and c when the locus of the center of gravity is YI, and after all, when the lens 1 is moved in a predetermined direction from a predetermined position with respect to an object at a certain finite distance, the output of the light receptor 7 follows the variation as shown in FIG. 3 and therefore, if the peak of this output is detected, the focused position of the lens 1 with respect to the object at this time can be detected.

Figure 10:
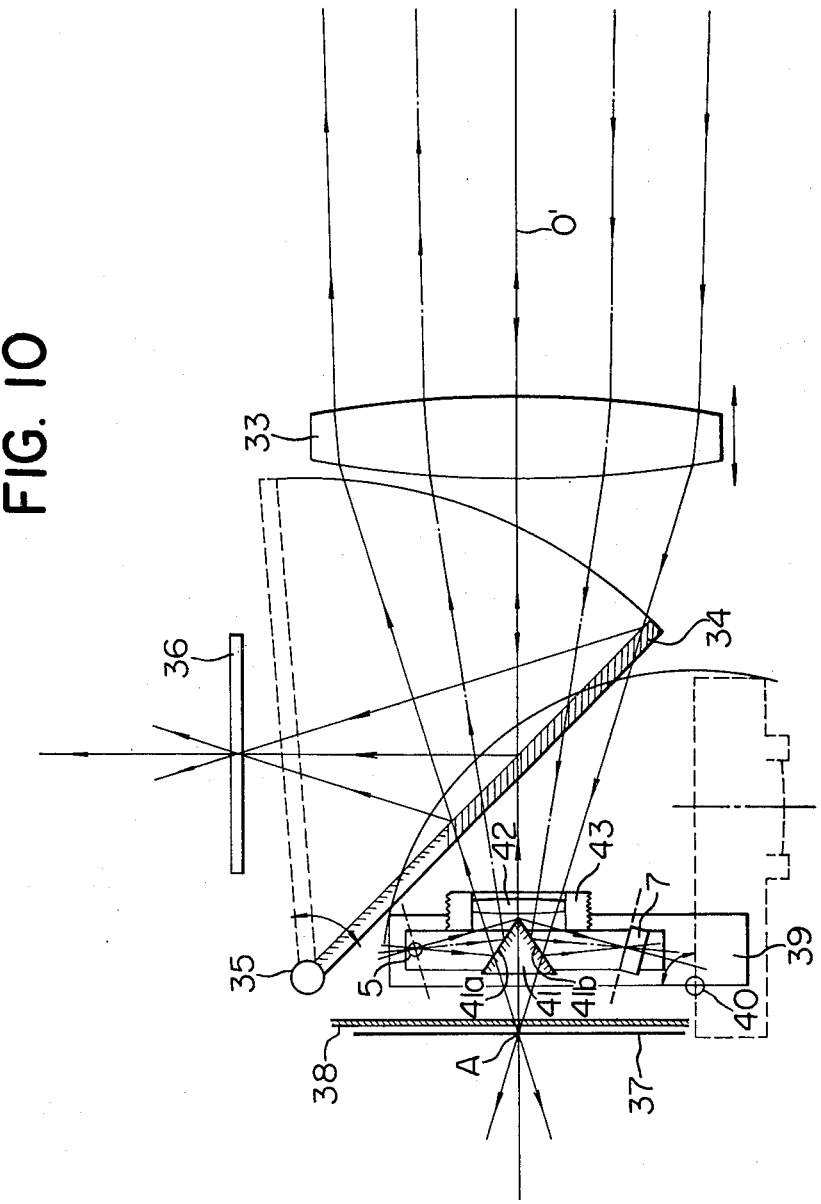
FIG. 10 is a schematic view of the construction of essential portions showing an example in which the second system illustrated in FIGS. 6 to 9 is adopted to constitute a TTL focus detection system in a single lens reflex camera.

Description will now be made of an example of the focus detection device adopting the second system so far described. FIG. 10 shows an example of the construction in which the focus detection system of FIGS. 6 and 7 is compactly rearranged and incorporated into the mirror box of a single lens reflex camera to thereby constitute a TTL focus detection system. In FIG. 10, reference character 33 designates a picture-taking lens, 34 a finder reflex mirror pivotably hinged by means of a shaft 35, 36 a focusing glass, 37 a film surface, 38 a focal plane shutter curtain, and 39 a housing having a pivot shaft 40 and turnable between an operative position indicated by solid line (an upright position behind the mirror 34) and an inoperative position indicated by broken line (a position in which the housing 39 is contained in the bottom of the camera) in response to the turning of the reflex mirror 34 between a position indicated by solid line in which it comes into the picture-taking light path and a position indicated by broken line in which it is retracted from the picture-taking light path. The focus detection system described in connection with FIGS. 6 and 7 is contained in the housing 39. Designated by 41 is a reflection prism having total reflection surfaces 41a and 41b. The prism 41 is disposed within the housing 39 in such a manner that the vertical point thereof is coincident with the optic axis O' of the lens 33 in upright condition of the housing 39, and the light-emitting device 5 and the light receptor 7 are disposed within the housing in such a manner that the centers of the light-emitting portion and the light-receiving portion there of are coincident with the points conjugate with the point of intersection A of the optic axis O' of the lens 33 or the film surface 37 set by the total reflection surfaces 41a and 41b, in upright condition of the housing 39. Denoted by 42 is a correction lens which will later be described. The correction lens 42 is held by a lens holder 43 and mounted to the housing 39. The emitted light from the light-emitting device 5 is reflected by the total reflection surface 41a of the prism 41 and projected through the correction lens 42, and the reflected light incident through the correction lens 42 is reflected by the total reflection surface 41b of the prism 41 toward the light receptor 7.

The mechanism for driving the housing may be of a construction which is operatively associated with the mirror raising mechanism for the reflex mirror 34 and in that case, the mechanism is constructed such that it brings the housing 39 to its camera bottom contained position with the upward movement of the mirror 34 to its position in which it is retracted from the picture-taking light path but in case of the downward movement of the mirror 34 to its position in which it comes into the picture-taking light path, it brings the housing 39 to its shown upright position a little before the downward movement of the mirror 34 is started.

The reflex mirror 34 is designed to pass therethrough the wavelength of light emitted from the light-emitting device 5 and to reflect the other wavelengths of light. That is, where the wavelength range of the light from the light-emitting device 5 is the infrared range, the mirror 34 is a cold mirror. In this case, the visible range images of the object are all reflected toward the focusing glass 36. The reflection factor of the mirror 34 made of a cold mirror for the visible range lights is slightly lower than that of the ordinary total reflection mirror, so that the finder is a little darker. To compensate for this, the mirror 34 may be partly made into a cold mirror. In designing, even if this is limited to a smaller portion or made into a larger size, the practical effect would hardly be lost. On the other hand, where the wavelength of the emitted light is in the visible range, if the mirror 34 is designed such that the wavelength of the emitted light from the light-emitting device 5 passes through a part of the mirror 34, a portion corresponding to the passed portion appears in the finder in a condition wherein only the wavelength of the emitted light is reduced in quantity of light, and the image observed in the finder becomes squalid. Therefore, where the wavelength of the emitted light is in the visible range, it would be advisable to design the mirror 34 such that the entire surface thereof is uniform so as to pass therethrough a particular wavelength and reflect all the other wavelengths.

Where the wavelength of the emitted light from the light-emitting device 5 is in the range beyond the visible range, chromatic aberration of the picture-taking lens 33 is sometimes not corrected in such a wavelength range. In such a case, the imaged position of the image by the visible light is not coincident with the image plane of the light of the emitted wavelength. Consequently, with the light-emitting device 5 and the light receptor 7 installed in a conjugate positional relationship with the point A under the visible range light, there occurs an error of focus detection corresponding to the amount by which the picture-taking lens 33 is not corrected by the wavelength. To correct this, the light-emitting device 5 and the light receptor 7 may be positionally adjusted by displacing the positions of the light-emitting device 5 and the light receptor 7 so that when the imaged position of the pre-corrected visible light by the picture-taking lens 33 lies on the film surface 37, the reflected light of the emitted light from the light-emitting device 5 reflected by the object is converged at the center of the light-receiving portion of the light receptor. In a single lens reflex camera, the picture-taking lens is interchangeable over a great variety of types and in this case, the adjusted position of the housing 39 may be predetermined for each interchangeable lens and an extraneously operable member such as dial or lever may be provided to move the housing 39 to a predetermined position during interchange of the lens, or alternatively, to cause this to be automatically effected with the lens interchange, a position correcting signal pin or signal cam indicative of the adjusted position of the housing 39 may be provided so that the position of the housing 39 may be automatically adjusted by such signal pin or signal cam with the lens mounting.

Such correction may be effected purely optically by providing the correction lens 42. That is, the correction lens 42 is for causing the imaged condition of the image by the light of the wavelength range of the light-emitting device 5 whose chromatic aberration is not corrected to be approximate as much as possible to the imaged condition of the image on the film surface 37 by the visible light whose chromatic aberration is corrected, in other words, for causing the light image by the light of the wavelength range emitted from the light-emitting device 5 and reflected by the object to be formed nearly most sharply on the center of the light-receiving portion of the light receptor 7.

FIG. 10 shows the case where the correction lens is used in common for the light-emitting device 5 and the light receptor 7, but correction lenses exclusively for the light-emitting device 5 and the light receptor 7 may safely be adopted if this is more effective. Also, this correction lens has a correction effect over a great variety of interchangeable lenses and particularly, by properly selecting the focal length of the correction lens and the installed position thereof on the optic axis and by properly selecting the wavelength range of the emitted light of the light-emitting device, correction within the depth of field becomes feasible for various types of interchangeable lens.

Although the description has been taken out of sequence, the circuit example in the embodiment shown in FIG. 4 can intactly be utilized as the detection circuit in the TTL detection system shown in FIG. 10.

Figure 11:
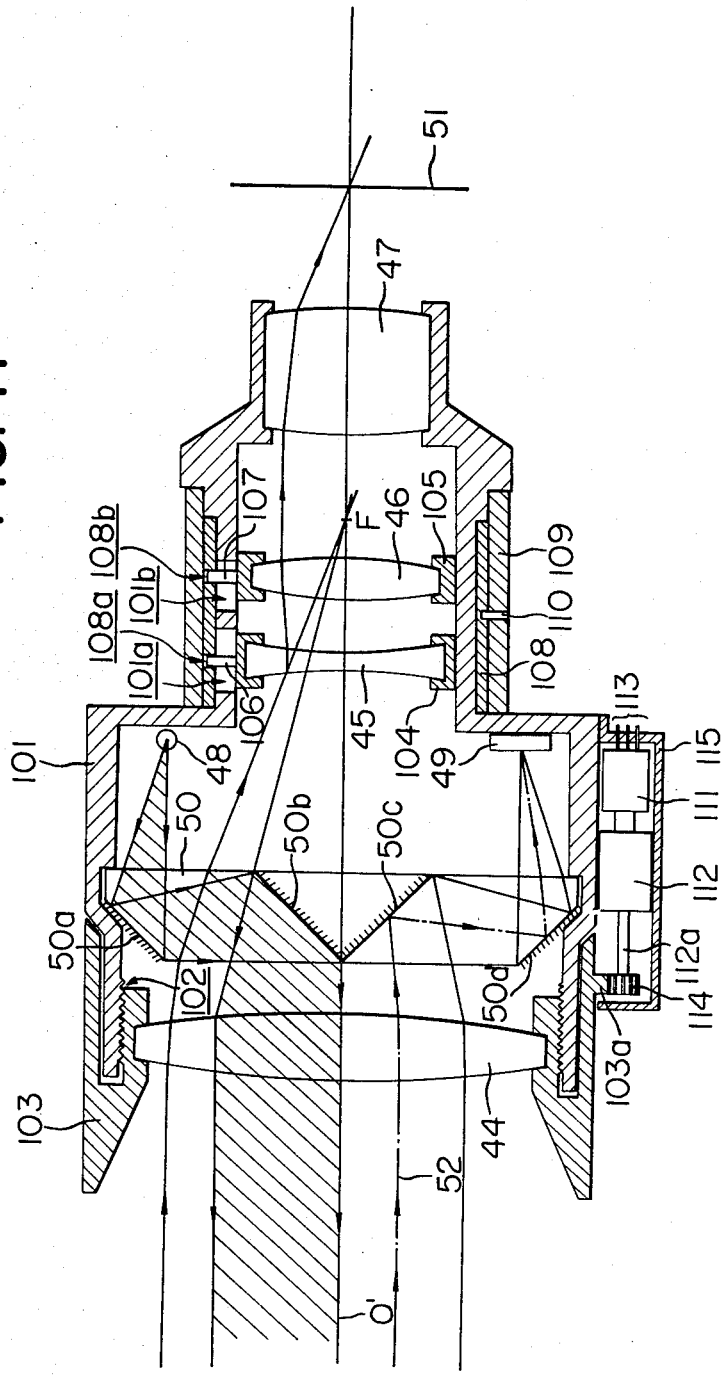
FIG. 11 is a cross-sectional view schematically showing the construction of an example in which the focus detection system adopting the second system is incorporated in a zoom lens.

Incidentally, the focus detection system as described in connection with FIG. 6 can be incorporated into an ordinary lens system and can easily constitute a TTL focus detection system in such lens system. FIG. 11 shows an example in which the focus detection system is incorporated into a zoom lens. In FIG. 11, reference character 44 denotes a focusing lens held by a focusing ring 103 connected to the fore end of a fixed lens barrel 101 through a helicoid mechanism 102. Accordingly, by rotating the focusing ring 103 to move the focusing lens 44 along the optic axis O' thereof, it is possible to accomplish focusing with respect to an object. Designated by 45 and 46 are a variator lens and a compensator lens forming a zooming lens group and held by lens holding frames 104 and 105, respectively, and slidably contained in the fixed lens barrel 101. Cam follower pins 106 and 107 studded in the outer periphery of the lens holding frames 104 and 105 pass through guide slots 101a and 101b formed in the direction of the optic axis in the fixed lens barrel 101, and are engaged with zooming cam slots 108a and 108b formed in a zooming cam ring 108. Accordingly, by rotating a zooming operation ring 109 connected to the cam ring 108 by a connector pin 110, the variator lens 45 and the compensator lens 46 are moved under a predetermined relationship along the optic axis O' through the cam slots 108a, 108b in the cam ring 108, thereby accomplishing the zooming. Denoted by 47 is a relay lens held by the fixed lens barrel 101.

For such construction of the zoom lens, the focus detection system described in connection with FIG. 6 is incorporated into the space between the focusing lens 44 and the variator lens 45 so as to accomplish the focus detection of the focusing lens 44 with respect to the object. Designated by 48 is a light-emitting device, 49 a light receptor, and 50 a complex prism constituting a reflecting optical system for the light-emitting device 48 and the light receptor 49 and having total reflection surfaces 50a, 50d and translucent surfaces 50b, 50c. The light-emitting device 48 is positioned in such a manner that the center of the light-emitting portion thereof is coincident with the conjugate point of the prearranged focus F of the focusing lens set by the translucent surface 50b and the total reflection surface 50a (namely, the position of the focus of the focusing lens 44 in its infinity focused condition), and the light receptor 49 is positioned in such a manner that the center of the light-receiving portion thereof is coincident with the conjugate point of the prearranged focus F set by the translucent surface 50c and the total reflection surface 50d. The translucent surfaces 50b and 50c are the so-called cold filter film which reflects the wavelength range of the emitted light from the light-emitting device 48 and passes therethrough the other wavelength range and for example, reflects heat radiation and passes the visible rays if the emitted light of the light-emitting device 48 is infrared or near-infrared light.

The total reflection surfaces 50a and 50d are for bending the light flux emitted from the light-emitting device 48 and the light flux impinging on the light receptor 49 and are not essential, but according to these, the positions of the light-emitting device 48 and the light receptor 49 do not greatly jut out of the lens barrel and accordingly, do not hamper the desire to make the lens system compact.

According to the construction hitherto described, the focus detection may be accurately achieved with the influence of the magnification change eliminated and moreover, the detection system is spaced apart from the film surface 51 so that the adverse effect on the image on the film surface 51 can be made very slight.

In FIG. 11, the portion indicated by hatching represents the emitted light from the light-emitting device 48, and numeral 52 represents the locus of the center of gravity of the reflected light flux from the object.

Incidentally, as the detection circuit in the above-described detection system, the circuit example in the embodiment shown in FIG. 4 may be intactly used where the light receptor of the construction as shown in FIGS. 2 and 9 is used as the light receptor 49. In this case, the circuit system may be provided on the camera body side, not shown, and may be suitably electrically connected to the light-emitting device 48 and the light receptor 49 provided on the zoom lens side, or alternatively, as shown, a circuit unit 111 formed by integrating the circuit system may be mounted on the outer periphery of the fixed lens barrel 101 with a motor 112 for automatically adjusting the focusing lens 44. Designated by 113 is the external connecting terminal of the circuit unit 111, and denoted by 115 is a housing for the circuit unit 111 and the motor 112. Also, in this case, the construction for driving the focusing lens 44 may be one in which a rack 103a is formed on a part of the outer periphery of the focusing ring 103 over a predetermined range and a pinion gear 114 mounted on the output shaft 112a of the motor 112 meshes with the rack 103a so that the focusing ring 103 is rotatively driven by the rotation of the motor 112, whereby the focusing lens 44 is moved along the optic axis O'.

Now, in the second system hitherto described, the focus adjusted condition of the image-forming lens is detected by utilizing a variation in the position of incidence of the light flux on the light receiving surface of the light receptor (the position of the center of gravity of the light flux) and it is therefore very readily possible to detect not only the focusing or non-focusing but also the directionality of the out-of-focus during the non-focusing, namely, the distinction between front focus and rear focus.

Description will now be made of some examples of the focus detection system adopting this second system which can detect the focusing or non-focusing of the image-forming lens as well as the directionality of the out-of-focus during the non-focusing.

Figure 12:
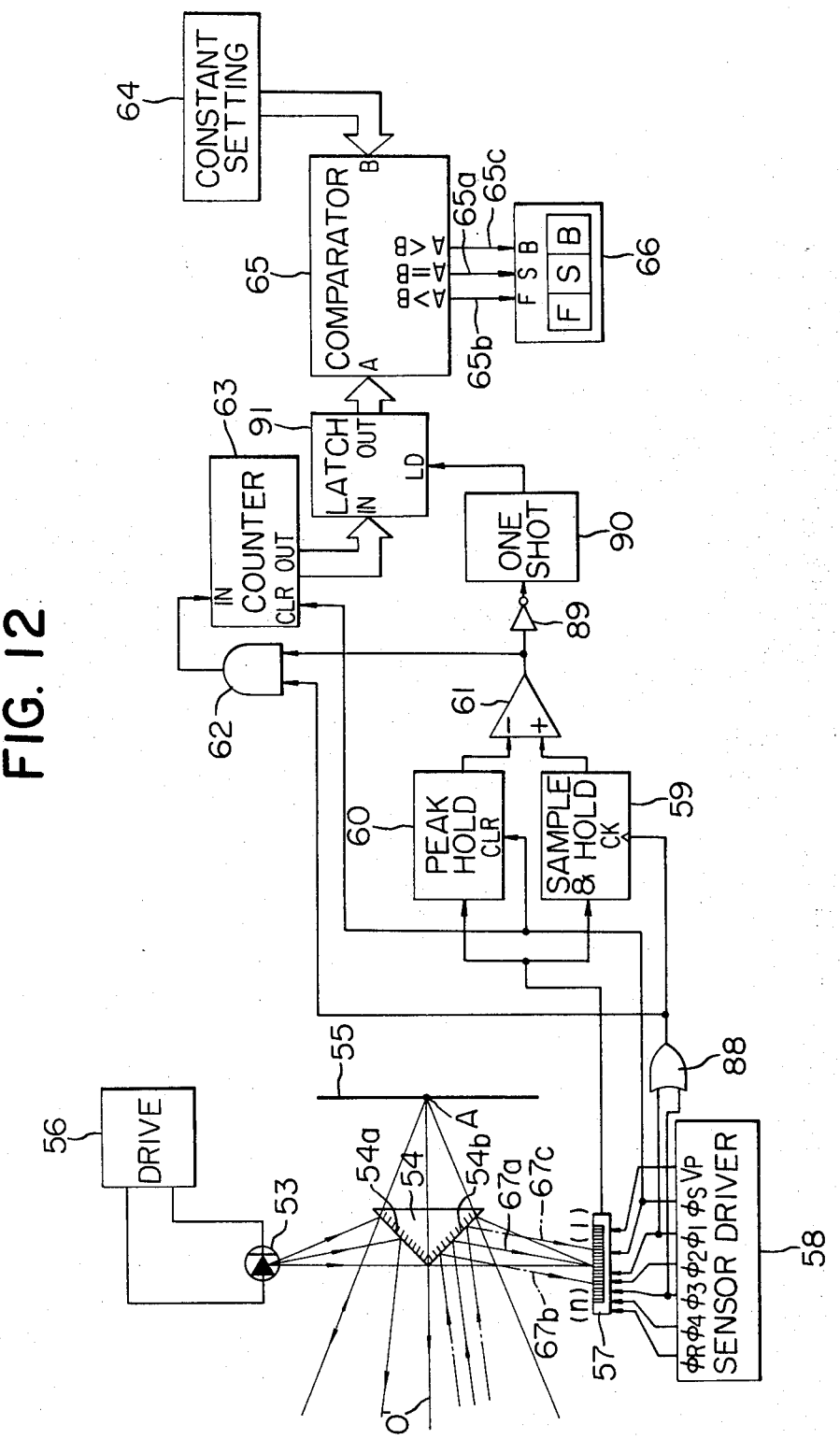
FIG. 12 shows chiefly the construction of the circuit system in a first embodiment of the device adopting the second system.

Referring first to FIG. 12, the example shown there utilizes a photosensor array (linear image sensor) such as CCD photosensor or MOS photodiode array as the light receptor. In FIG. 12, reference numeral 53 designates a light-emitting device such as light-emitting diode which is disposed in such a manner that the center of the light-emitting portion thereof is coincident with a position conjugate with the point of intersection A on the focusing plane 55 set by the reflection surface 54a of the prism 54 with the optic axis O' of an image-forming optical system, not shown. Denoted by 56 is a driving circuit for driving the light-emitting device 53. The driving circuit 56 is designed to supply a bias current to the light-emitting device 53 to thereby turn on the same where it is supplied with power from a power source, not shown. Reference numeral 57 designates a photosensor array having n sensor elements (it is herein a four-phase transfer type CCD photosensor). The photosensor array 57 is so disposed that a particular sensor element located at the central portion of the sensor element array thereof is coincident with a point conjugate with the point A which is set by the reflection surface 54b of the prism 54. Designated by 58 is a sensor driven for driving the sensor array 57. The sensor drive 58 is of a well-known construction which imparts a photogate voltage $V_p$, a shift gate pulse $\phi_s$, four-pulse transfer clock pulses $\phi_1$-$\phi_4$ and a reset pulse $\phi_R$. Denoted by 59 is a sample and hold circuit for sampling and holding the output of the photosensor array 57. Transfer clock pulses $\phi_1$ and $\phi_3$ are adapted to be imparted as the sampling pulse of the sample and hold circuit 59 through an OR gate 88. (That is, a scanning output is obtained from the photosensor array device 57 in synchronism with the transfer clock pulses $\phi_1$ and $\phi_3$. For this purpose, the reset pulse $\phi_R$ is synchronous with the pulses $\phi_1$ and $\phi_3$.) Designated by 60 is a peak hold circuit for holding the peak of the output of the photosensor array 57. The peak hold circuit 60 is adapted to be cleared by a shift gate pulse $\phi_3$. Reference character 61 denotes a comparator for comparing the magnitude of the output of the sample and hold circuit 59 with the magnitude of the output of the peak hold circuit 60. The comparator 61 is designed to receive the output of the sample and hold circuit 59 at its non-inverting input and to receive the output of the peak hold circuit 60 at its inverting input, and to put out a high-level signal when the output of the sample and hold circuit 59 is equal to or larger than the output of the peak hold circuit 60 and to put out a low-level signal when the output of the sample and hold circuit 59 is smaller than the output of the peak hold circuit 60. Designated by 62 is an AND gate for taking the logic product of the output of the comparator 61 and the output of an OR gate 88. Transfer clock pulses $\phi_1$ and $\phi_3$ are put out from the AND gate 62 only when the output of the comparator 61 is at high level. Denoted by 63 is a binary counter for counting the numbers of the transfer clock pulses $\phi_1$ and $\phi_3$ imparted from the AND gate 62. The binary counter 63 is designed to be cleared by a shift gate pulse $\phi_3$. Reference numeral 89 denotes an inverter for obtaining the output of the comparator 61 in an inverted logic, 90 a monostable or one-shot multivibrator adapted to be triggered to put out a single pulse when the output of the inverter 89 has changed from low to high, 91 a digital latch circuit responsive to the output pulse from the monostable multivibrator 90 to latch the count output of the counter 63 at this point of time, and 64 a constant setting circuit in which a digital data representing the address of the particular sensor element located at the central portion of the sensor element in the photosensor array 57 is set in a binary code. Denoted by 65 is a digital comparator for comparing the output of the latch circuit 91 with the digital data set in the constant setting circuit 64 and discriminating between the magnitudes thereof. Designated by 66 is a display device for displaying the focus, the front focus and the rear focus in accordance with the output of the comparator 65. The display device 66 has character display portions "F", "S" and "B" which respectively signify the front focus, the focus and the rear focus.

Now, in the above-described construction, when the light-emitting device 53 is turned on by the driving circuit 56 and the driving of the photosensor array 57 is started by the sensor driver 58, the peak hold circuit 60 and the counter 63 are first cleared by the then shift gate pulse $\phi_s$, and then a time series signal corresponding to the then distribution pattern of quantity of light on the sensor element array is put out from the photosensor array device 57 in synchronism with the clock pulses $\phi_1$ and $\phi_3$ and this is imparted to the sample and hold circuit 59 and the peak hold circuit 60. Here, the then time series output from the photosensor array 57 is gradually increased in level until it reaches the output signal from the sensor element which is coincident with the center of gravity of the reflected light flux from the object and therefore, the then outputs of the sample and hold circuit 59 and the peak hold circuit 60 are similarly increased at the same level as are the outputs of the differential amplifier 23 and the peak hold circuit 24 in the circuit system of FIG. 4 shown in FIGS. 5E and 5F, for example, and accordingly, in the meantime, the comparator 61 continues to put out a high-level signal because the two inputs thereof are equal, whereby the transfer clock pulses $\phi_1$ and $\phi_3$ are imparted to the counter 63 through the AND gate 62 immediately after the counter 63 has been cleared by the shift gate pulse $\phi_3$. When the output of the photosensor array 57 reaches the output signal from the sensor element of the sensor element array which is coincident with the center of gravity of the then reflected light flux, the output of the photosensor array 57 reaches its peak at this point of time, so that the outputs of the sample and hold circuit 59 and the peak hold circuit 60 also reach their peaks at this point of time and after this, namely, when the output signal from the element next to the sensor element located at the locus of the aforementioned center of gravity is reached, the output of the photosensor array 57 slightly drops from its peak value, so that the output of the peak hold circuit 60 remains at its peak value while the output of the sample and hold circuit 59 drops therefrom and accordingly, at this point of time, the output of the comparator 61 changes from high to low, whereby the transfer clock pulses $\phi_1$ and $\phi_3$ imparted from the AND gate 62 to the counter 63 are cut off, so that the counter 63 stops counting.

On the other hand, when the output of the comparator 61 changes from high to low, the output of the inverter 89 changes from low to high, so that the monostable multivibrator 90 is triggered to put out a single pulse and in response thereto, the latch circuit 91 comes to latch the count output of the counter 63 at this point of time. When the count output of the counter 63 is taken into the latch circuit 91, the comparator 65 compares the then output data of the latch circuit 91 with the output data from the constant setting circuit 64 and produces a signal corresponding to the difference in magnitude between these two data. Accordingly, assuming for example that the locus of the center of gravity of the reflected light flux entering the photosensor array 57 is 67b, the then count value of the counter 63 at the stoppage of the counting becomes greater than the output data from the constant setting circuit 64, so that in this case the output line 65b of the comparator 65 representing "A>B" assumes high level and the character display portion "F" of the display device 66 is turned on thereby to display the front focus. Conversely, if the locus of the center of gravity is 67c, the then count value of the counter 63 at the stoppage of the counting becomes smaller than the output data from the setting circuit 64, so that in this case the output line 65c of the comparator 65 representing "A>B" assumes high level and the character display portion "B" of the display device 66 is turned on thereby to display the rear focus. By adjustment of an optical system, not shown, the locus of the center of gravity becomes 67a and the center of gravity of the light flux becomes coincident with the particular sensor element of the sensor element array which is located at the central portion, the then count value of the counter 63 at the stoppage of the counting becomes coincident with the output data of the setting circuit 64, so that in this case the output line 65a of the comparator 65 representing "A=B" assumes high level and the character display portion "S" of the display device 66 is turned on thereby to display to focus. In this state, the image-forming optical system is adjusted to a focused position with respect to the object.

In this example shown in FIG. 12, the detection of the focus, front focus and rear focus is accomplished in the manner described above. In the shown example, the result of the detection is displayed only by the display device 66, but it is readily possible to realize an automatic focus adjusting system by utilizing the output of the comparator 65 to suitably control the optical system driving motor. That is, this may be accomplished by controlling the motor so that the motor is rotated, for example, in normal direction by the output signal of the comparator 65 representing "A>B" to move the optical system toward the close-up position, and the motor is rotated in reverse direction by the output signal representing "A>B" to move the optical system toward the infinity position, and the motor is stopped by the output signal representing "A×B". Incidentally, where a CCD photosensor is employed as the photosensor array device, it is possible to make it respond only to infrared or near-infrared light by thickening the $n^+$ polycrystal Si layer and $SiO_2$ layer of the light-sensing portion thereof more than usual.

Figure 13:
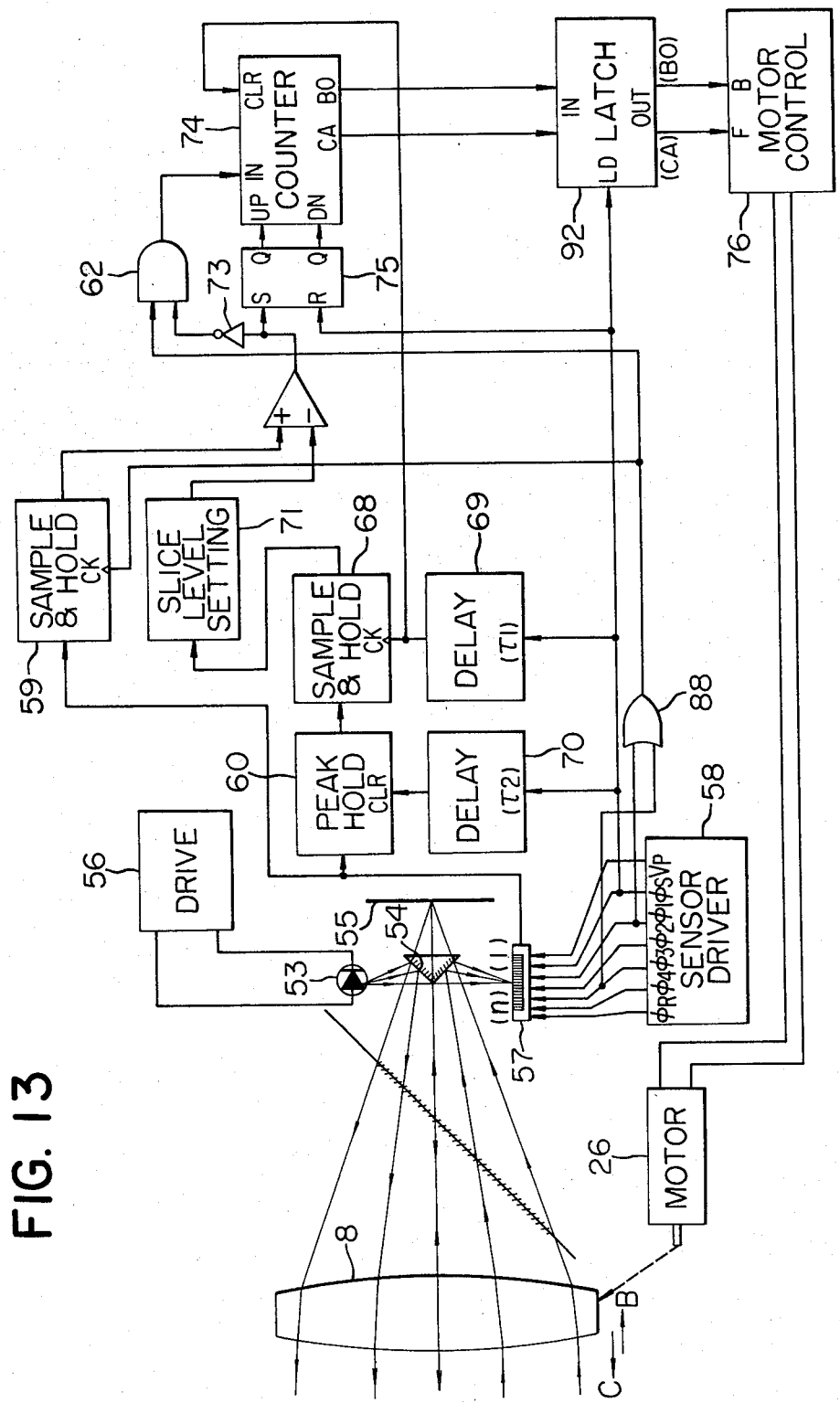
FIG. 13 shows chiefly the construction of the circuit system in a second embodiment of the device adopting the second system.

The example shown in FIG. 13 is a modification of the example shown in FIG. 12. In this example, a slice level is determined at a predetermined projection for the peak value of the output of the photosensor array and the output of the photosensor array obtained during the next cycle of reading is sliced on the basis of the slice level and the distinction between the focus and the front focus and the rear focus is detected by detecting in which position of the time series output signal the then sliced output signal has been located. That is, if the sliced signal portion corresponds just to the central portion of the photosensor array output, it means that the image-forming optical system lies at its focused position; in contrast, if the sliced signal portion corresponds to the portion forward or rearward of the central portion, as will be appreciated from the example of FIG. 12, it means that the image-forming optical system is in the state of rear focus or front focus, and thus the distinction between the focus, the front focus and the rear focus can be discriminated. In the construction shown in FIG. 13, the elements designated by reference numerals identical to those in FIGS. 4 and 12 are identical to those already described.

Designated by 68 in FIG. 13 is a sample and hold circuit for sampling and holding the output of the peak hold circuit 60. A pulse resulting from delaying the shift date pulse $\phi_s$ by a time $\tau_1$ by a delay circuit 69 having a delay time $\tau_1$ is imparted as the sampling pulse for the sample and hold circuit 68. On the other hand, the peak hold circuit 60 is adapted to be cleared by a pulse resulting from delaying the shift gate pulse $\phi_s$ by a time $\tau_2$ by a delay circuit 70 having a delay time $\tau_2$ ($\tau_2 > \tau_1$). Accordingly, the peak hold circuit 60 is cleared after the sample and hold circuit 69 samples and holds the peak value held in the peak hold circuit 60. Designated by 71 is a slice level setting circuit for setting the slice level by multiplying the output of the sample and hold circuit 68 by a certain constant smaller than "1" ) e.g. about 0.6 to about 0.8). Denoted by 72 is a slicing comparator for slicing the output of the sample and hold circuit 59 in accordance with the slice level set by the slice level setting circuit 71. The slicing comparator 72 is adapted to receive the slice level at its inverting input and to receive the output of the sample and hold circuit 59 at its non-inverting input, thereby putting out a high-level signal when the output of the sample and hold circuit 59 exceeds the slice level. The AND gate 62 is adapted to take the logical product of the inverted signal of the comparator 72 output inverted by an inverter 73 and the output of an OR gate 88, and accordingly, transfer clock pulses $\phi_1$ and $\phi_3$ are developed from the AND gate 62 while the output of the comparator 72 is low. Denoted by 74 is a binary up-down or reversible counter for counting the numbers of the transfer clock pulses $\phi_1$ and $\phi_3$ imparted through the AND gate 62. The binary up-down counter 74 is adapted to be cleared by the output pulse from the delay circuit 69. Reference numeral 75 designates an RS-flip-flop for setting the counting mode of the counter 74. The shift gate pulse $⑱_s$ is imparted to the reset input R of the flip-flop 75 and the output of the comparator 72 is imparted to the set input S of the flip-flop 75, and the Q output of the flip-flop 75 is imparted as an up-count or increment instruction signal to the counter 74 and the Q output thereof is imparted as a down-count or decrement instruction signal to the counter 74. Reference character 92 denotes a latch circuit for latching the output of the counter 74, namely, in the present case, a carry signal CA and a borrow signal BO, in response to the shift gate pulse $\phi_s$. Designated by 76 is a motor control for controlling the motor 26 in accordance with the output of the latch circuit 92. The motor control 76 is adapted to rotate the motor 26, for example, in normal direction to move the lens 8 in the direction of arrow B when the carry signal CA of the counter 74 is latched by the latch circuit 92, and to rotate the motor 26, for example, in its reverse direction to move the lens 8 in the direction of arrow C when the borrow signal BO is latched, and to hold the motor 26 in stopped condition when neither the carry signal CA nor the borrow signal BO is latched. As a specific construction of the motor control circuit 76, use may be made of the construction of the motor control 28 as shown, for example, in FIG. 4A, and in the present embodiment, it may be designed such that the output of the latch circuit 92 corresponding to the carry signal of the counter 74 is imparted to the bases of transistors $Tr_1$ and $Tr_2$ and that the output of the latch circuit 92 corresponding to the borrow signal BO of the counter 74 is imparted to the bases of transistors $Tr_3$ and $Tr_4$. In the case of the present embodiment, the transistor $Tr_5$ may be eliminated.

Now, in the above-described construction, when the light-emitting device 53 is turned on by the drive circuit 56 and the driving of the photosensor array 57 is started by the sensor driver 58, the flip-flop 75 is first reset by the then shift gate pulse $\phi_s$ and the Q output thereof becomes high, so that the counter 74 becomes set to the up-count or incremental mode. Then, when a time serial signal corresponding to the then distribution pattern of quantity of light on the sensor element array is put out from the photosensor array 57 in accordance with transfer clock pulses $\phi_1$-$\phi_4$, this is sampled and held by the sample and hold circuit 59 while it is peak-held by the peak hold circuit 60, and the then output of the sample and hold circuit 59 is sliced with the slice level set in the slice level setting circuit 71 by the comparator 72 but at this point of time, the output of the slice level setting circuit 71 is zero, so that, the output of the comparator 72 becomes high as soon as the output of the sample hold circuit 59 is provided, and accordingly, the transfer clock pulses $\phi_1$ and $\phi_3$ are not imparted to the counter 74, which thus is in count-stopped condition.

When this cycle of reading of the photosensor array output is terminated and the shift gate pulse $\phi_s$ is produced during the initiation of the next cycle of reading, a sampling pulse is imparted from the delay circuit 69 to the sample and hold circuit 68 at a point of time whereat the time $\tau_1$ has elapsed from the point of time whereat the pulse $\phi_s$ was generated, whereby the sample and hold circuit 68 samples and holds the peak value held by the peak hold circuit 60, namely, the peak value obtained during the previous cycle of reading, and at this point of time, the slice level setting circuit 71 puts out a slice level in accordance with the then output of the sample and hold circuit 59. Thereafter, when a time $\tau_2$-$\tau_1$ elapses, the peak hold circuit 60 is cleared by the pulse from the delay circuit 70.

Then, when a timer series signal is again put out from the photosensor array 57 by the transfer clock pulses $\phi_1$-$\phi_4$, the above-described operation is repeated in the sample and hold circuit 59 and the peak hold circuit 60 and here, in a condition wherein the then output of the sample and hold circuit 59 is lower than the aforementioned slice level, the output of the comparator 72 becomes low and accordingly, the transfer clock pulses $\phi_1$ and $\phi_3$ are imparted to the counter 74 through the AND gate 62 and at this time, the counter 74 is in its up-count mode and so counts up or increments one by one in response to the transfer clock pulses $\phi_1$ and $\phi_3$. When the level of the output of the sample and hold circuit 59 gradually rises and exceeds the slice level, the output of the comparator 72 changes from low to high at this point of time, whereby the transfer clock pulses $\phi_1$ and $\phi_3$ imparted from the AND gate 62 to the counter 74 are cut off and the flip-flop 75 is set so that the Q output thereof becomes high, and the counter 74 stops counting in a condition wherein it has been changed over to the down-count mode. When the output of the sample and hold circuit 59 has reached its peak and then again drops below the slice level, the output of the comparator 72 again changes from high to low and thus, the imparting of the transfer clock pulses $\phi_1$ and $\phi_3$ from the AND gate 62 to the counter 74 is resumed and the counter 74 now counts down or decrements one by one in accordance with the transfer clock pulses $\phi_1$ and $\phi_3$.

Figure 14:
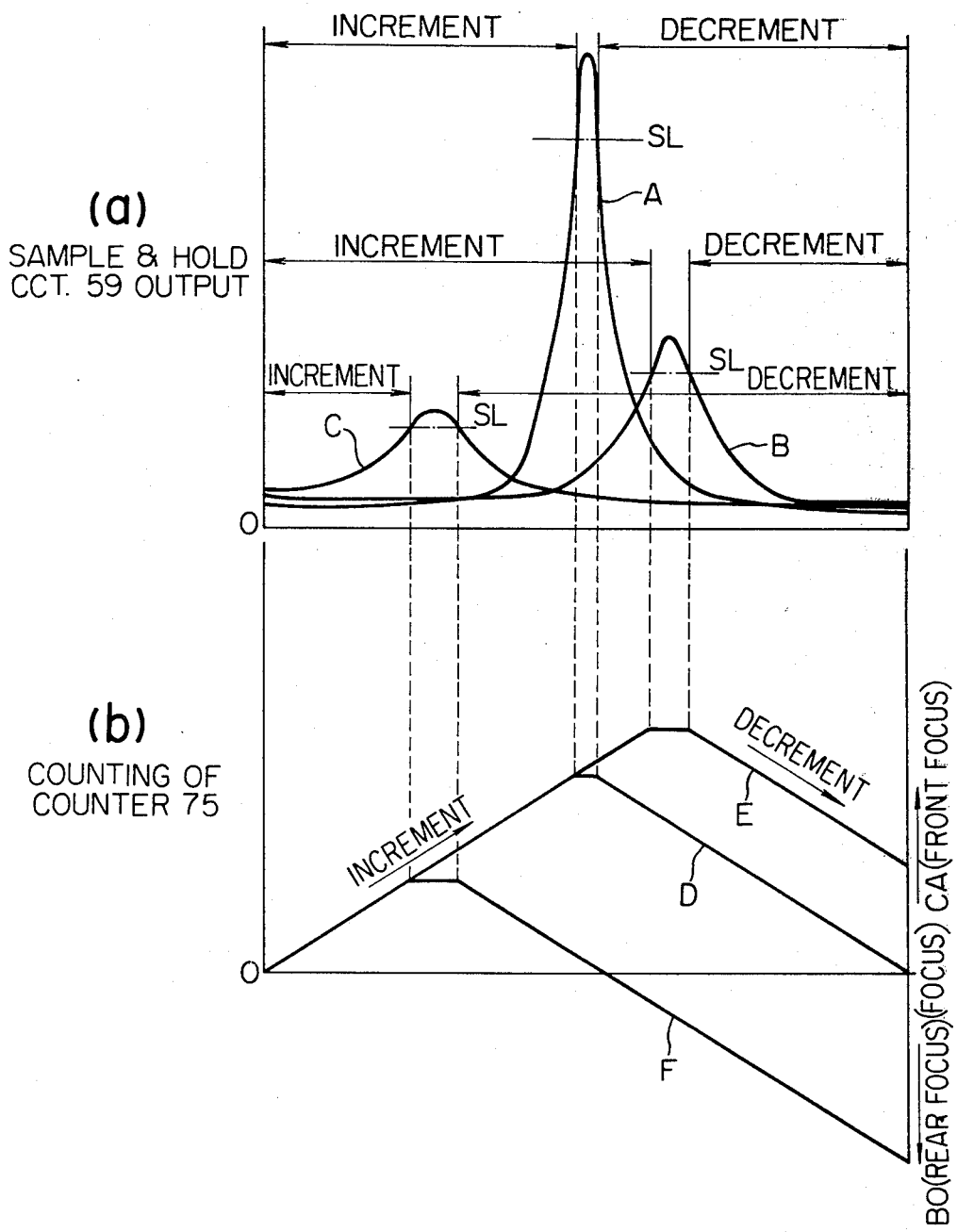
FIG. 14 shows the output waveforms and state of operation in the circuit blocks of essential portions in the circuit system of FIG. 13.

The relation between the state of the output of the counter 74 when it has completed the up-count and the down-count in a general way and the then state of the output of the sample and hold circuit 59 is such as shown in FIGS. 14A and 14B. That is, assuming that the locus of the center of gravity of the reflected light flux impinging on the photosensor array 57 is such as indicated by 67b in FIG. 12, the then output of the sample and hold circuit 59 becomes such as shown by B in FIG. 14A (in FIG. 14A, SL indicates the slice level) and accordingly, the counting operation of the counter 74 at this time becomes such as shown by E in FIG. 14B, and the counter 74 comes to put out carry signal CA when it has completed the up-count and the down-count in a general way. In contrast, assuming that the locus of the center of gravity of the reflected light flux impinging on the photosensor array 57 is such as shown by 67c in FIG. 12, the then output of the sample and hold circuit 59 becomes such as shown by C in FIG. 14A and accordingly, the counting operation of the counter 74 at this time becomes such as shown by F in FIG. 14B, and the counter 74 comes to put out borrow signal BO when it has completed the up-count and the down-count in a general way. When the locus of the center of gravity becomes just as indicated by 67a in FIG. 12, the output of the sample and hold circuit 59 becomes such as shown by A in FIG. 14A and accordingly, the counting operation of the counter 74 at this time becomes such as shown by D in FIG. 14B, and the content of the counter 74 is zero, that is, there is neither carry nor borrow, when the counter 74 has completed the up-count and the down-count in a general way.

Thus, when there is neither carry nor borrow (that is, when CA and BO are both low), the output of the counter 74 represents the focus; when the carry signal CA is high, the output of the counter 74 represents the front focus; and when the borrow signal is high, the output of the counter 74 represents the rear focus. Accordingly, as already noted, automatic focus adjustment may be accomplished if the carry signal and borrow signal of the counter 74 are imparted to the motor control 76 through the latch circuit 92 so as to control the motor 26 to move the lens 8 in the direction of arrow B when the carry signal CA of the counter 74 is high and to move the lens 8 in the direction of arrow C when the borrow signal BO is high.

The output of the sample and hold circuit 59 actually assumes a staircase-like waveform corresponding to the sampling pulse, but the output waveforms A, B and C in FIG. 14A are shown in wave-like waveforms, taking the envelopes thereof.

Figure 15:
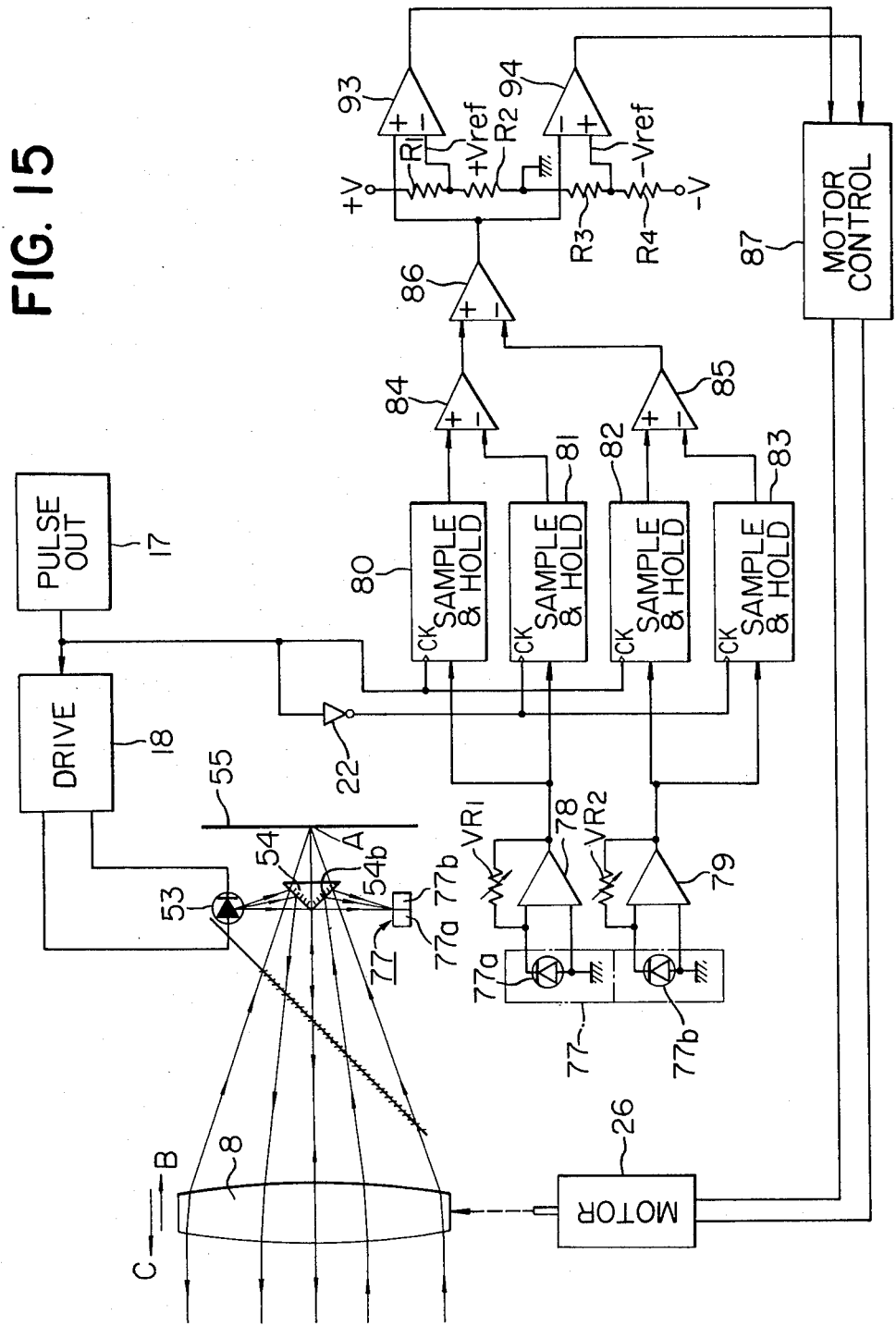
FIG. 15 shows chiefly the construction of the circuit system in a third embodiment of the device adopting the second system.

Reference is finally had to FIG. 15 to describe an example in which a photoelectric light receptor comprising two independent light-receiving devices are used as the photoelectric light receptor and the difference in output between the two elements is detected to thereby make the distinction between the focus, the front focus and the rear focus. In FIG. 15, the elements designated by reference characters identical to those in FIGS. 4, 12 and 13 are identical to those already described.

Designated by 77 in FIG. 15 is a light receptor comprising two light-receiving devices (e.g. silicon photodiodes) 77a and 77b having the light-receiving surfaces thereof limited to a relatively small area and made integral with a boundary therebetween. The light receptor 77 is disposed in such a manner that the center point on the boundary between the two elements 77a and 77b is coincident with the conjugate point of the point A in a plane conjugate with the prearranged focal plane 55 which is set by the reflection surface 54b of a prism 54. Reference characters 78 and 79 denote preamplifiers for amplifying the outputs of the light-receiving devices 77a and 77b, respectively, and $VR_1$ and $VR_2$ designate variable resistors for adjusting the gains of the preamplifiers. Denoted by 80 and 81 are sample and hold circuits for sampling and holding the output of the preamplifier 78, and designated by 82 and 83 are sample and hold circuits for sampling and holding output of the preamplifier 79. The pulse from the pulse output circuit 17 (see FIG. 5A) is imparted as the sampling pulse to the sample and hold circuits 80 and 82, and the inverted pulse of this pulse inverted by the inverter 22 is imparted as the sampling pulse to the sample and hold circuits 81 and 83. Therefore, signals resulting from sampling and holding the outputs of the light-receiving elements 77a and 77b when the light-emitting device 53 is emitting light are put out from the sample and holding circuits 80 and 82, and signals resulting from sampling and holding the outputs of the light-receiving devices 77a and 77b when the light-emitting device 53 is turned off are put out from the sample and hold circuits 81 and 83. Designated by 84 is a differential amplifier for obtaining the difference between the outputs of the sample and hold circuits 80 and 81. The differential amplifier 84 is adapted to receive the output of the sample and hold circuit 80 at the non-inverting input thereof and to receive the output of the sample and hold circuit 81 at the inverting input thereof. Denoted by 85 is a differential amplifier for obtaining the difference between the outputs of the sample and hold circuits 82 and 83. The differential amplifier 85 is adapted to receive the output of the sample and hold circuit 82 at the non-inverting input thereof and to receive the output of the sample and hold circuit 83 at the inverting input thereof. Thus, from these differential amplifiers 84 and 85, there are obtained output signals of the light-receiving devices 77a and 77b responding only to the light of the emitted wavelength from the light-emitting device 53. Denoted by 86 is a differential amplifier for obtaining the difference between the outputs of the differential amplifiers 84 and 85. Reference character 93 and 94 designate comparators for comparing the output of the differential amplifier 86 with predetermined reference voltages $+V_{ref}$ and $-V_{ref}$ set by voltage dividing resistors $R_1-R_2$ and $R_3-R_4$. The comparator 93 is adapted to receive the output of the differential amplifier 86 at the non-inverting input thereof and to receive the reference voltage $+V_{ref}$ at the inverting input thereof, thereby putting out a high-level signal only when the output level of the differential amplifier 86 is above the reference voltage $+V_{ref}$. On the other hand, the comparator 94 is adapted to receive the output of the differential amplifier 86 at the inverting input thereof and to receive the reference voltage $-V_{ref}$ at the non-inverting input thereof, thereby developing a high-level signal only when the output level of the differential amplifier 86 is below the reference voltage $-V_{ref}$. Denoted by 87 is a motor control for controlling the motor 26 in response to the outputs of the comparators 93 and 94. The motor control 87 is so designed that it rotates the motor 26, for example, in normal direction to move the lens 8 in the direction of arrow B when the output of the comparator 93 is high, that it rotates the motor, for example, in the reverse direction to move lens 8 in the direction of arrow C when the output of the comparator 94 is high, and that it stops the motor 26 when the outputs of the comparators 93 and 94 are both low. Incidentally, the motor control 28 as shown in FIG. 4A may be intactly used as the motor control 87. That is, in case of the present embodiment, the output of the comparator 93 may be imparted to the bases of transistors $Tr_1$ and $Tr_2$ and the output of the comparator 94 may be imparted to the bases of transistors $Tr_3$ and $Tr_4$. In this case, the transistor $Tr_5$ is eliminated.

Figure 16:
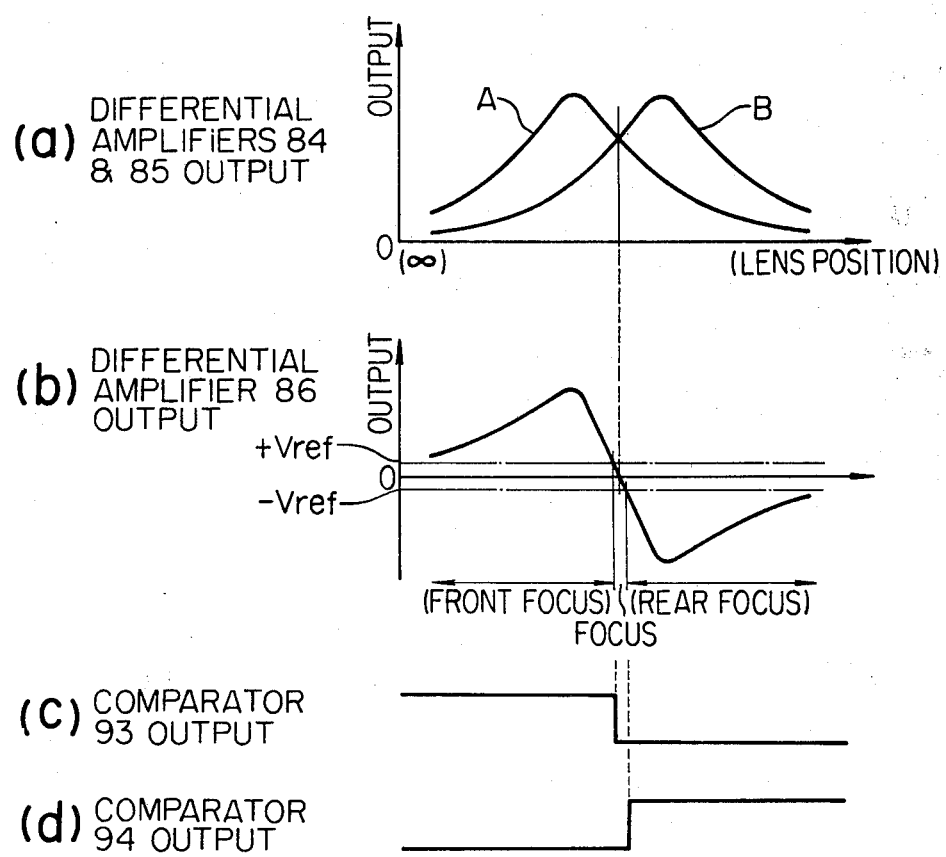
FIGS. 16(a)–16(d) are output waveform plots showing the outputs in the circuit blocks of essential portions in the circuit system of FIG. 15.

In the above-described construction, the output signals of the light-receiving devices 77a and 77b responding only to the light of the emitted wavelength range from the light-emitting device 53 and according to such arrangement and construction, the devices 77a of the two light-receiving devices 77a and 77b is provided for the detection of the front focus and the device 77b is provided for the detection of the rear focus and therefore, assuming that the lens 8 is moved from the infinity focused position toward the close-up focused position (namely, in the direction of arrow C) with respect to an object at a certain finite distance, the outputs of the differential amplifiers 84 and 85 become such as indicated by A and B in FIG. 16A and accordingly, the output of the differential amplifier 86 becomes varied from the positive through zero to the negative as shown in FIG. 16B. At this time, the positive output represents the front focus, the negative output represents the rear focus and the zero output represents the focus. Thus, basically, automatic focus adjustment may be accomplished if such design is made that the motor control 87 controls the motor 26 to move the lens 8 in the direction of arrow B when the output of the differential amplifier is positive, to move the lens 8 in the direction of arrow C when the output of the differential amplifier is negative, and to stop the motor when the output of the differential amplifier is zero. However, in controlling the motor 26, it is very difficult and not practical from the operating characteristic of the differential amplifier to impart the output of the differential amplifier 86 directly to the motor control 87 and thereby effect the control of the motor 26. Therefore, in the present embodiment, the comparators 93, 94 and the reference voltage setting resistors $R_1-R_2$, $R_3-R_4$ (these constitute the so-called wind comparator) are provided, whereby, as will be appreciated from FIGS. 16B, 16C and 16D, a substantial focus area is set in the opposite side areas of the true focus point as long as it practically suits its convenience and the control of the motor 26 is effected in accordance with the outputs of the comparators 93 and 94.

As has hitherto been described in detail, the present invention, as an active type focus detection device used in an optical instrument such as camera or the like, eliminates any interlocking mechanism between the image-forming optical system whose focus is to be adjusted and the focus detection system and the detection accuracy there of is remarkably enhanced and particularly, as a TTL type focus detection system, the device of the present invention can be readily incorporated into a small instrument like a camera.

Particularly, according to the second system, in addition to the discrimination between the focus and the non-focus, the directionality of the out-of-focus during the non-focus, namely, the distinction between the front focus and the rear focus can be detected highly sensitively and accurately and this is very useful to constitute an automatic focus adjusting system as shown in the embodiments. On the other hand, in the first system, both the light-emitting device and the light receptor are in conjugate relationship with the prearranged focal plane of the image-forming optical system, whereby the deviation of the point of focus of the optical system affects much more the light-receiving condition of the light receptor and this leads to a greater sensitivity of the detection performance.

Such effect is further increased by placing the substantial center of the light-emitting portion of the light-emitting device and the substantial center of the light-receiving portion of the light receptor in mutually conjugate relationship as in the embodiments adopting the first and second systems, and reaches the maximum when these centers are placed in conjugate relationship with the point of intersection between the prearranged focal plane and the optic axis of the optical system.

What we claim is:

1. In an optical instrument having an image forming optical system which is movable along an optical axis to form an image of an object on a predetermined imaging plane, a system for detecting the focusing condition of said optical system with respect to said object, comprising:

(A) radiation generating means for generating radiation;

(B) first optical means for projecting the radiation generated by said radiation generating means toward said object through a portion of an effective aperture of said image forming optical system, wherein the center of gravity of distribution, on a plane including said effective aperture, of the projected radiation is remote from the optical axis of said optical system;

said radiation generating means being disposed substantially in coincidence with a plane optically equivalent to said predetermined imaging plane which is set by said first optical means;

(C) radiation sensing means capable of responding to the radiation generated by said radiation generating means;

(D) second optical means for causing at least a part of the radiation reflected by said object and then entering through another portion of the effective aperture of said image forming optical system to be directed to said radiation sensing means, wherein the center of gravity of distribution on the plane including the effective aperture, of the radiation directed to said radiation sensing means is remote from the optical axis of said optical system;

said radiation sensing means being disposed substantially in coincidence with a position optically equivalent to the location of said radiation generating means which is set by said first and second optical means so that the position of the center of gravity of the radiation distribution on an effective radiation surface of said radiation sensing means varies in accordance with the focus adjusted condition of said image forming optical system with respect to said object.

2. The system according to claim 1, wherein said radiation generating means is disposed with the substantial center thereof coincident with a point optically equivalent to the point of intersection between the optical axis of said image forming optical system and said predetermined imaging plane, and said radiation sensing means is disposed so that the center of the effective radiation-receiving surface thereof is substantially in an optically equivalent relationship with the substantial center of said radiation generating means.

3. The system according to claim 1, wherein at least one of said radiation generating means and said first optical means is designated to project radiation of a particular wavelength range, and said radiation sensing means is positionally preadjusted so that the center of the effective radiation-receiving surface thereof is substantially coincident with the converging position of the radiation of said particular wavelength range reflected by said object in the focusing condition of said image forming optical system with respect to said object.

4. The system according to claim 1, wherein at least one of said radiation generation means and said first optical means is designed to project a radiation of a particular wavelength range, and the system further comprises correcting means for making the converging position of the radiation of said particular wavelength range reflected by said object substantially coincident with the center of the effective radiation-receiving surface of said radiation sensing means in the focusing condition of said image forming optical system with respect to said object.

5. The system according to claim 3 or 4, wherein said radiation sensing means has a response characteristic exclusively for the radiation of said particular wavelength.

6. The system according to claim 3 or 4, wherein said second optical means is designed to cause exclusively the radiation of said particular wavelength range, of the radiation entering through said image forming optical system, to impinge on said radiation sensing means.

7. The system according to claim 3 or 4, further comprising means for limiting the radiation to be received by said radiation sensing means to the radiation of said particular wavelength range.

8. The system according to claim 1, further comprising means for limiting the radiation to be projected toward said object through said image forming optical system and the radiation to be received by said radiation sensing means to a radiation of a particular wavelength range and wherein said radiation sensing means is positionally preadjusted so that the center of the effective radiation-receiving surface thereof is substantially coincident with the converging position of the radiation of said particular wavelength range reflected by said object in the focusing condition of said image forming optical system with respect to said object.

9. The system according to claim 1, further comprising:

means for limiting the radiation to be projected toward said object through said image forming optical system and the radiation to be received by said radiation sensing means to a radiation of a particular wavelength range; and correcting means for making the converging position of the radiation of said particular wavelength range reflected by said object in the focusing condition of said image forming optical system with respect to said object substantially coincident with the center of the effective radiation-receiving surface of said radiation sensing means.

10. The system according to claim 8 or 9, wherein said optical instrument is a camera and said limiting means is formed of at least a portion of a finder reflex mirror disposed between said image forming optical system and said predetermined imaging plane in said camera.

11. The system according to claim 1 to 4, 8 or 9, wherein said first optical means and said second optical means are formed in a common prism.

12. The system according to claim 3, 4, 8 or 9, wherein the radiation of said particular wavelength range is near-infrared light or infrared light, and said radiation sensing means is adjusted or corrected so that the center of the effective radiation-receiving surface thereof is substantially coincident with the converging position of the near-infrared or infrared light reflected by said object in the focusing condition of said image forming optical system with respect to said object.

13. The system according to claim 1, wherein said second optical means is designed to limit the radiation to be directed to said radiation sensing means at maximum to the radiation passed through a half area of the effective aperture of the image forming optical system, whereby the position of the center of gravity of the distribution of said radiation is varied substantially along the radiation-receiving surface of said radiation sensing means in accordance with the variation in the focus adjusted condition of said image forming optical system with respect to said object, and said radiation sensing means is designed so that an electrical output thereof is varied in accordance with the variation in the position of the center of gravity of the distribution of said radiation on the effective radiation-receiving surface of said radiation sensing means.

14. The system according to claim 13, wherein said first optical means is designed to limit the radiation to be projected toward said object through said image forming optical system, at maximum to the radiation passing through the other half area of the effective aperture of said image forming optical system.

15. The system according to claim 13 or 14, wherein said radiation generating means is designed to generate a radiation having directionality, and is adjusted so that the major axis of the directionality of the radiation projected by said first optical means passes through a marginal portion remote from the center of said image forming optical system in the other half area of the effective aperture of said image forming optical system.

16. The system according to claim 13, wherein said radiation sensing means is designed so that the electrical output thereof reaches its peak when the position of the center of gravity of the distribution of said radiation becomes substantially to coincidence with the center of the effective radiation-receiving surface of said radiation sensing means, and the system further comprises a detection circuit coupled to said radiation sensing means to detect the focusing condition of said image forming optical system with respect to said object on the basis of the output of said radiation sensing means, said detection circuit being designed to detect whether or not the electrical output of said radiation sensing means has reached its peak during continuous adjustment of said image forming optical system, to thereby detect whether or not said image forming optical system has reached the focusing position thereof with respect to said object.

17. The system according to claim 13, wherein said radiation sensing means is provided with two substantially independent sensing portions and is disposed so that the center of the boundary between said two sensing portions is substantially in coincident relationship with the substantial center of said radiation generating means, and the system further comprises a detection circuit coupled to said radiation sensing means to detect the focusing condition of said image forming optical system with respect to said object on the basis of the output of said radiation sensing means, said detection circuit being designed to compare the outputs of said two sensing portions to thereby detect the focus adjusted condition of said image forming optical system with respect to said object.

18. The system according to claim 16 or 17 further comprising drive means coupled to said radiation generating means to intermittently drive said generating means, said radiation generating means being driven by said drive means so as to intermittently generate said radiation, and wherein said detection circuit includes circuit means coupled to said radiation sensing means and said drive means to subtract the response output of said radiation sensing means when said radiation generating means is not generating the radiation from the response output of said radiation sensing means when said radiation generating means is generating the radiation, in association with the intermittent driving of said radiation generating means by said drive means.

19. The system according to claim 13, wherein said radiation sensing means is an image sensor having an array of sensing elements, and the system further comprises a detection circuit coupled to said radiation sensing means to detect the focus adjusted condition of said image forming optical system with respect to said object on the basis of the output of said radiation sensing means, said detection circuit being designed to detect the deviation of the position of the center of gravity of said radiation from the center of the effective radiation-receiving surface of said radiation sensing means, on the basis of the output of said radiation sensing means.

20. The system according to claim 16, 17 or 19, further comprising control means coupled to said image forming optical system and said detection circuit to control said image forming optical system on the basis of the output of said detection circuit.

21. A zoom lens assembly comprising:
(A) a focusing lens group having an optical axis and movable along the axis so as to form an image of an object on a predetermined imaging plane;
(B) a zooming lens group positioned behind said focusing lens group and movable along said axis so as to effect zooming;
(C) radiation generating means for generating radiation:
(D) first optical means for projecting the radiation generated from said radiation generating means toward said object through said focusing lens group;
said radiation generating means being disposed substantially in coincidence with a plane optically equivalent to said predetermined imaging plane which is set by said first optical means;
(E) radiation sensing means capable of responding to the radiation generated from said radiation generating means; and
(F) second optical means for causing at least part of the radiation reflected by said object and then entering through said focusing lens group to be directed to said radiation sensing means;
said radiation sensing means being disposed substantially in coincidence with a position optically equivalent to the location of said radiation generating means which is set by said first and second optical means so that an electrical output of said radiation sensing means is variable in accordance with the focus adjusted condition of said image forming optical system with respect to said object.

22. The lens assembly according to claim 21, wherein said first and second optical means are disposed in the space between said focusing lens group and said zooming lens group and each is provided with at least one half-mirror.

23. The lens assembly according to claim 22, wherein said radiation generating means is disposed with the substantial center thereof being substantially coincident with a point optically equivalent to the point of intersection between the optical axis of said image forming optical system and said predetermined imaging plane, and said radiation sensing means is disposed so that the center of the effective radiation-receiving surface thereof is substantially in an optically equivalent relationship with the substantial center of said radiation generating means.

24. The lens assembly according to claim 22, wherein at least one of said radiation generating means and said first optical means is designed to project radiation of a particular wavelength range, and said radiation sensing means is positionally preadjusted so that the center of the effective radiation-receiving surface thereof is substantially coincident with the converging position of the radiation of said particular wavelength range reflected from said object in the focusing condition of said focusing lens group with respect to said object.

25. The lens assembly according to claim 24, wherein said radiation sensing means has a response characteristic exclusively for the radiation of said particular wavelength range.

26. The lens assembly according to claim 24 or 25, wherein said second optical means is designed to cause exclusively the radiation of said particular wavelength range, of the radiation entering through said focusing lens group, to impinge on said radiation sensing means.

27. The lens assembly according to claim 26, wherein the radiation of said particular wavelength range is near-infrared or infrared light and said radiation sensing means is adjusted or corrected so that in the focusing condition of said focusing lens group with respect to said object, the center of the effective radiation-receiving surface of said radiation sensing means is substantially coincident with the converging position of the near-infrared or infrared light reflected from said object.

28. The lens assembly according to claim 21, wherein said second optical means is designed to limit the radiation to be directed to said radiation sensing means at maximum to the radiation passed through a half area of an effective aperture of said focusing lens group, whereby the position of the center of gravity of distribution of said radiation is varied substantially along an effective radiation-receiving surface of said radiation sensing means in accordance with the variation in the focus adjusted condition of said focusing lens group with respect to said object, and wherein said radiation sensing means is designed so that the electrical output thereof is varied in accordance with the variation in the position of the center of gravity of the distribution of said radiation on the effective radiation-receiving surface of said radiation sensing means.

29. The lens assembly according to claim 28, wherein said first optical means is designed to limit the radiation to be projected toward said object through said focusing lens group, at maximum to the radiation passing through the other half area of the effective aperture of said focusing lens group.

30. The lens assembly according to claim 28 or 29, wherein said radiation generating means is designed to generate a radiation having directionality, and is adjusted so that the major axis of the directionality of the radiation projected by said first optical means passes through a marginal portion remote from the focusing lens group in the other half area of the effective aperture of said focusing lens group.

31. The lens assembly according to claim 28, wherein said radiation sensing means is designed so that the electrical output thereof reaches its peak when the position of the center of gravity of the distribution of said radiation becomes converged substantially in coincidence with the center of the effective radiation receiving surface of said radiation sensing means, and the lens assembly further comprising a detection circuit coupled to said radiation sensing means to detect the focusing condition of said focusing lens group with respect to said object on the basis of the output of said radiation sensing means, said detection circuit being designed to detect whether or not the electrical output of said radiation sensing means has reached its peak during continuous adjustment of said focusing lens group, to thereby detect whether or not said focusing lens group has reached the focused position with respect to said object.

32. The lens assembly according to claim 28, wherein said radiation sensing means is provided with two substantially independent sensing portions and is disposed so that the center of the boundary between said two sensing portions is substantially in a coincident relationship with the substantial center of said radiation generating means, and the lens assembly further comprising a detection circuit coupled to said radiation sensing means to detect the focusing condition of said focusing lens group with respect to said object on the basis of the output of said radiation sensing means, said detection circuit being designed to compare the outputs of said two sensing portions to thereby detect the focus adjusted condition of said focusing lens group with respect to said object.

33. The lens assembly according to claim 23, wherein said radiation sensing means is an image sensor having an array of sensing elements, and the lens assembly further comprises a detection circuit coupled to said radiation sensing means to detect the focus-adjusted condition of said focusing lens group with respect to said object on the basis of the output of said radiation sensing means, said detection circuit being designed to detect the deviation of the position of the center of gravity of the distribution of said radiation from the center of the effective radiation-receiving surface of said radiation sensing means, on the basis of the output of said radiation sensing means.

34. The lens assembly according to claim 31 or 32, further comprising:
drive means coupled to said radiation generating means to intermittently drive said generating means, said radiation generating means being driven by said drive means so as to intermittently generate said radiation, and wherein said detection circuit includes circuit means coupled to said radiation sensing means and said drive means to subtract the response output of said radiation sensing means when said radiation generating means is not generating the radiation from the response output of said radiation sensing means when said radiation generating means is generating the radiation, in association with the intermittent driving of said radiation generating means by said drive means.

35. The lens assembly according to any one of claims 31, 32 and 33, further comprising:
control means coupled to said focusing lens group and said detection circuit to control said focusing lens group on the basis of the output of said detection circuit.

36. In an optical instrument having an objective lens which is movable along an optical axis so as to form an image of an object on a predetermined focal plane, a system for detecting the focusing condition of said objective lens to said object, comprising:
(A) a radiation source for generating a radiation ray;
(B) a radiation sensor responsive to the radiation ray generated by said radiation source; and
(C) an optical system positioned behind said objective lens for projecting the radiation ray generated by said radiation source toward said object through a portion of an effective aperture of the objective lens to cause at least a part of the radiation ray which is reflected by the object and then enters through another portion of the effective aperture of the objective lens, to be directed to said radiation sensor, wherein the center of gravity of distribution on a plane including said effective aperture, of the projected radiation and of the radiation ray directed to said radiation sensor are respectively remote from the optical axis of the objective lens;
said radiation source being disposed substantially in coincidence with a plane optically equivalent to said predetermined focal plane with respect to said optical system, said radiation sensor being disposed substantially in coincidence with a position optically equivalent to the location of the radiation source with respect to the optical system so that the position of the center of gravity of distribution of the reflected part of the radiation ray on an effective radiation-receiving surface of the radiation sensor varies in accordance with the focusing condition of the objective lens to the object.

37. The system according to claim 36, wherein said radiation sensor is disposed with respect to said optical system so that the center of the effective radiation-receiving surface thereof is substantially in an optically equivalent relationship with the substantial center of said radiation source.

38. The system according to claim 37, wherein said radiation sensor is a self-scanning type radiation sensor having an array of a plurality of sensing elements and producing a time-seriated scanning output indicative of the distribution of the radiation ray on the receiving surface thereof, and the system further comprises a focus detecting circuit coupled to said radiation sensor to detect the focus-adjusted condition of said objective lens with respect to said object on the basis of the time-seriated output of said radiation sensor, said detecting circuit being designed to detect the deviation of the position of the center of gravity of the distribution of said radiation ray from the center of the effective radiation-receiving surface of said radiation sensor, on the basis of the time-seriated output of said radiation sensor.

39. The system according to claim 37, wherein the effective radiation-receiving surface of said radiation sensor is divided into two regions of almost the same size by a boundary which substantially traverses at said center of the receiving surface the direction of the variation of the position of the center of gravity of the distribution of the reflected part of the radiation ray on the receiving surface of the radiation sensor, and the system further comprises:
a focus detecting circuit for detecting the focusing condition of said objective lens to said object on the basis of an electrical output of said radiation sensor, said circuit being coupled to the radiation sensor and arranged to detect a positional relationship of the position of the center of gravity of the distribution of the reflected part of the radiation ray on the effective radiation-receiving surface of the radiation sensor with respect to said boundary of said two regions by comparing the amount of the radiation falling upon one of the two regions with the amount of the radiation falling upon the other region on the basis of said electrical output.

40. The system according to claim 39, wherein said focus detecting circuit produces an electrical output indicative of the focusing condition of the objective lens to the object which has a characteristic when the position of the center of gravity of the distribution of the reflected part of the radiation ray substantially coincides with the boundary of said two regions, said characteristic indicating the condition of in-focus of the objective lens onto the object.

41. The system according to claim 39 or 40, further comprising:
a driving circuit coupled to said radiation source to intermittently drive the source for causing the source to intermittently generate the radiation ray;
said focus detecting circuit being coupled to said driving circuit and operable to detect said positional relationship of the position of the center of gravity of the distribution of the reflected radiation ray with respect to said boundary of the two regions by comparing a difference signal between the response output corresponding to a first one of said two regions when the radiation source is generating the radiation ray and the response output corresponding to said first region when the radiation source is not generating the radiation ray with a difference signal between the response output corresponding to the second one of the two regions when the radiation source is generating the radiation ray and the response output corresponding to said second region when the radiation source is not generating the radiation ray.

42. A system for detecting focusing condition of an objective lens to an object, comprising:
(A) a radiation projector for projecting a radiation ray through a portion of an effective aperture of said objective lens toward said object;
(B) a radiation detector for detecting the radiation ray reflected by the object and then entering through the other portion of the effective aperture of the objective lens, said radiation detector being disposed so that the position of the center of gravity of distribution of the reflected ray on an effective radiation detecting surface of the radiation detector varies in accordance with the focusing condition of the objective lens to the object, said effective radiation detecting surface of the radiation detector being divided into two regions of almost the same size by a boundary which traverses the direction of the variation of the position of the center of gravity of the distribution of the reflected ray on the surface in accordance with change in the focusing condition of the objective lens;

(C) a projection control circuit for causing said radiation projector to intermittently project the radiation ray; and (D) a focus detecting circuit for detecting the focusing condition of said objective lens to the object on the basis of an electrical output of said radiation detector, said focus detecting circuit being arranged to detect a relative positional relationship of the position of the center of gravity of the distribution of the radiation ray on the detecting surface of the radiation detector with respect to said boundary of said two regions by comparing a difference signal between a response output of the radiation detector corresponding to a first one of said two regions when said radiation projector is projecting the radiation ray and a response output corresponding to said first region when the projector is not projecting the radiation ray, with a difference signal between a response output of the radiation detector corresponding to the second one of said two regions when the radiation projector is projecting the radiation ray and a response output corresponding to said second region when the projector is not projecting the radiation ray.

43. A zoom lens assembly comprising:

(A) a lens system including a zooming lens group operable for effecting zooming and a focusing lens group operable for effecting focusing of the whole lens system onto an object;

(B) a radiation source for generating a radiation ray;

(C) a radiation sensor responsive to the radiation ray generated by said radiation source; and (D) an optical system positioned between said focusing lens group and said zooming lens group of said lens system, and arranged for projecting the radiation ray generated by said radiation source toward said object through the focusing lens group to cause at least a portion of the radiation ray which is reflected by the object and then enters through the focusing lens group, to be directed to said radiation sensor;

said radiation sensor being disposed at a predetermined position with respect to said optical system so that the incident condition of the reflected portion of the ray on the sensor varies in accordance with the focusing condition of the whole lens system effected by the focusing lens group.

44. The zoom lens assembly according to claim 43, wherein said optical system is arranged for projecting the radiation ray generated by said radiation source toward said object through a portion of an effective aperture of the focusing lens group and to cause at least a part of the radiation ray which is reflected by the object and then enters through another portion of the effective aperture of the focusing lens group, to be directed to said radiation sensor;

said radiation sensor being disposed with respect to said optical system so that the position of the center of gravity of the distribution of the reflected ray on the sensor varies in accordance with focusing condition of the whole lens system effected by the focusing lens group.

45. The zoom lens assembly according to claim 44, wherein said radiation sensor is disposed with respect to said optical system so that the center of the effective radiation-receiving surface thereof is substantially in an optically equivalent relationship with the substantial center of said radiation source.

46. The zoom lens assembly according to claim 45, wherein the effective radiation-receiving surface of said radiation sensor is divided into two regions of almost the same size by a boundary which substantially traverses at said center of the receiving surface the direction of the variation of the position of the center of gravity of the distribution of the reflected radiation ray on the receiving surface of the radiation sensor, and the lens assembly further comprises:

a focus detecting circuit for detecting the focusing condition of said lens system to said object on the basis of an electrical output of said radiation sensor, said circuit being coupled to the radiation sensor and arranged to detect the positional relationship of the position of the center of gravity of the distribution of the reflected radiation ray on the effective radiation-receiving surface of the radiation sensor with respect to said boundary of said two regions by comparing the amount of the radiation falling upon one of the two regions with the amount of the radiation falling upon the other region on the basis of said electrical output.

47. The zoom lens assembly according to claim 46, wherein said focus detecting circuit produces an electrical output indicative of the focusing condition of the lens system to the object which has a characteristic when the position of the center of gravity of the distribution of the reflected portion of the radiation ray substantially coincides with the boundary of said two regions, said characteristics indicating the condition of in-focus of the lens system onto the object.

48. The zoom lens assembly according to claim 47, further comprising:

a driving dircuit coupled to said radiation source to intermittently drive the source for causing the source to intermittently generate the radiation ray;

said focus detecting circuit being coupled to said driving circuit and operable to detect said positional relationship of the position of the center of gravity of the distribution of the reflected radiation ray with respect to said boundary of the two regions by comparing a difference signal between the response output corresponding to a first one of said two regions when the radiation source is generating the radiation ray and the response output corresponding to said first region when the radiation source is not generating the radiation ray with a difference signal between the response output corresponding to the second one of the two regions when the radiation source is generating the radiation ray and the response output corresponding to said second region when the radiation source is not generating the radiation ray.

49. The zoom lens assembly according to claim 45, wherein said radiation sensor is a self-scanning type radiation sensor having an array of a plurality of sensing elements and producing a time-seriated scanning output indicative of the distribution of the radiation ray on the receiving surface thereof, and the lens assembly further comprises a focus detecting circuit coupled to said radiation sensor to detect the focus-adjusted condition of said lens system with respect to said object on the basis of the time-seriated output of said radiation sensor, said detecting circuit being designed to detect the deviation of the position of the center of gravity of the distribution of said radiation ray from the center of the effective radiation-receiving surface of said radiation sensor, on the basis of the time-seriated output of said radiation sensor.

50. A zoom lens assembly comprising:

(A) a lens system including a zooming lens group operable for effecting zooming and a focusing lens group operable for effecting focusing of the whole lens system onto an object;
(B) a lens housing for housing therein said lens system;
(C) a radiation projector disposed within said housing for projecting a radiation ray through a portion of said lens system toward said object; and
(D) a radiation detector disposed within said housing for detecting the radiation ray reflected by said object through a portion of said lens system, said detector being arranged so that the incident condition of the reflected ray on the detector varies in accordance with focusing condition of the whole lens system effected by said focusing lens group.

51. The zoom lens assembly according to claim 50, wherein said radiation projector is arranged for projecting the radiation ray through a portion of an effective aperture of said focusing lens group, and said radiation detector is arranged for receiving the reflected radiation ray which enters through another portion of the effective aperture of the focusing lens group, so that the position of the center of gravity of distribution of the reflected ray on the detector varies in accordance with the focusing condition of the whole lens system effected by said focusing lens group.

52. A system for detecting focusing condition of an objective lens to an object, comprising:

(A) a radiation projector for projecting a radiation ray through a portion of an effective aperture of said objective lens toward said object;
(B) a radiation detector for detecting the radiation ray reflected by the object and then entering through another portion of the effective aperture of the objective lens, said radiation detector being disposed so that the position of the center of gravity of distribution of the reflected ray on an effective radiation-detecting surface of the radiation detector varies in accordance with focusing condition of the objective lens to the object, said radiation detector being a self-scanning type radiation detector which has an array of a plurality of detecting elements and produces a time-seriated scanning output indicative of the distribution of the radiation ray on the detecting surface thereof; and
(C) a focus detecting circuit coupled to said radiation detector to detect focus-adjusted condition of said objective lens with respect to said object on the basis of the time-seriated output of said radiation detector, said detecting circuit being designed to detect the deviation of the position of the center of gravity of the distribution of said radiation ray from the center of the effective radiation-receiving surface of said radiation detector, on the basis of the time-seriated output of said radiation detector.

* * * * *

UNITED STATES PATENT AND TRADEMARK OFFICE
CERTIFICATE OF CORRECTION

PATENT NO. : 4,357,085

DATED : November 2, 1982

INVENTOR(S) : YUKICHI NIWA, ET AL.

It is certified that error appears in the above-identified patent and that said Letters Patent is hereby corrected as shown below:

Column 23, line 17, "A > B" should read --A < B--;
          line 47, "A > B" should read --A < B--.

Column 24, line 46, "Ⓡ$_s$" should read --$\phi_s$--.

Column 30, line 9, "designated" should read --designed--.

Signed and Sealed this

Twelfth Day of April 1983

[SEAL]

Attest:

GERALD J. MOSSINGHOFF

Attesting Officer     Commissioner of Patents and Trademarks